US008392381B2

(12) United States Patent
Al-Kateb et al.

(10) Patent No.: US 8,392,381 B2
(45) Date of Patent: Mar. 5, 2013

(54) SYSTEMS AND METHODS FOR RESERVOIR SAMPLING OF STREAMING DATA AND STREAM JOINS

(75) Inventors: Mohammed Al-Kateb, Colchester, VT (US); Byung Suk Lee, Essex Junction, VT (US); Xiaoyang Wang, Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 86 days.

(21) Appl. No.: 12/599,163

(22) PCT Filed: May 8, 2008

(86) PCT No.: PCT/US2008/063028
§ 371 (c)(1),
(2), (4) Date: Sep. 6, 2011

(87) PCT Pub. No.: WO2008/137978
PCT Pub. Date: Nov. 13, 2008

(65) Prior Publication Data
US 2011/0313977 A1    Dec. 22, 2011

Related U.S. Application Data

(60) Provisional application No. 60/916,669, filed on May 8, 2007.

(51) Int. Cl.
*G06F 17/30* (2006.01)
(52) U.S. Cl. .......................................... 707/688
(58) Field of Classification Search ................... None
See application file for complete search history.

(56) References Cited

U.S. PATENT DOCUMENTS

| 6,532,458 | B1  |   | 3/2003 | Chaudhuri et al. |     |
|-----------|-----|---|--------|------------------|-----|
| 6,542,886 | B1  | * | 4/2003 | Chaudhuri et al. | 1/1 |
| 7,536,403 | B2  | * | 5/2009 | Gemulla et al.   | 1/1 |

FOREIGN PATENT DOCUMENTS

WO        2008137978       11/2008

OTHER PUBLICATIONS

International Search Report and Written Opinion dated Sep. 8, 2008, with regard to related PCT/US2008/063028 filed May 8, 2008, Al-Kateb et al.
Yi-Leh Wu et al., "Query Estimation by Adaptive Sampling", In: Proceedings of the 18th International Conference on IEEE Data Engineering, Edited by Rakesh Agrawal et al., San Jose: IEEE, Feb. 26-Mar. 1, 2002, pp. 639-648.

(Continued)

*Primary Examiner* — Belinda Xue
(74) *Attorney, Agent, or Firm* — Downs Rachlin Martin PLLC

(57) ABSTRACT

Algorithms and concepts for maintaining uniform random samples of streaming data and stream joins. These algorithms and concepts are used in systems and methods, such as wireless sensor networks and methods for implementing such networks, that generate and handle such streaming data and/or stream joins. The algorithms and concepts directed to streaming data allow one or more sample reservoirs to change size during sampling. When multiple reservoirs are maintained, some of the algorithms and concepts periodically reallocate memory among the multiple reservoirs to effectively utilize limited memory. The algorithms and concepts directed to stream joins allow reservoir sampling to proceed as a function of the probability of a join sampling operation. In memory limited situations wherein memory contains the sample reservoir and a join buffer, some of the stream join algorithms and concepts progressively increase the size of the sampling reservoir and reallocate memory from the join buffer to the reservoir.

32 Claims, 10 Drawing Sheets

OTHER PUBLICATIONS

Paul G. Brown et al., "Techniques for Warehousing of Sample Data", In: Proceedings of the 22th International Conference on IEEE Data Engineering, Edited by Ling Liu et al., Atlanta: IEEE, Apr. 3-7, 2006, pp. 6-6.

Yan-Nei Law et al., "Load Shedding for Window Joins on Multiple Data Stream", In: Proceedings of the 23rd International Conference on IEEE Data Engineering Workshop, Edited by Vincent Oria et al, Istanbul: IEEE, Apr. 15-16, 2007, pp. 674-683.

Jaewoo Kang et al, "Evaluating Window Joins Over Unbounded Streams", In: Proceedings of the 19th International Conference on IEEE Data Engineering, Edited by Umeshwar Dayal et al., Bangalore, India: IEEE, Mar. 5-8, 2003, pp. 341-352.

* cited by examiner

SYSTEMS AND METHODS FOR RESERVOIR SAMPLING OF STREAMING DATA AND STREAM JOINS

RELATED APPLICATION DATA

This application claims the benefit of priority of U.S. Provisional Patent Application Ser. No. 60/916,669, filed May 8, 2007, and titled "Adaptive/Progressive Reservoir Sampling Of Streaming Data And Stream Joins," which is incorporated by reference herein in its entirety.

STATEMENT OF GOVERNMENT INTEREST

Subject matter of this disclosure was made with government support under National Science Foundation Grant No. IIS-0415023. The government may have certain rights in this subject matter.

FIELD OF THE INVENTION

The present invention generally relates to the field of statistical sampling. In particular, the present invention is directed to systems and methods for reservoir sampling of streaming data and stream joins.

BACKGROUND

Uniform random sampling has been known for its usefulness and efficiency for generating consistent and unbiased estimates of an underlying population. In this sampling scheme, every possible sample of a given size has the same chance to be selected. Uniform random sampling has been heavily used in a wide range of application domains such as statistical analysis, computational geometry, graph optimization, knowledge discovery, approximate query processing, and data stream processing.

When data subject to sampling come in the form of a data stream (e.g. stock price analysis, and sensor networks monitoring), sampling encounters two major challenges. First, the size of the stream is usually unknown a priori and, therefore, it is not possible to predetermine the sampling fraction (i.e., sampling probability) by the time sampling starts. Second, in most cases the data arriving in a stream cannot be stored and, therefore, have to be processed sequentially in a single pass. A technique commonly used in this scenario is reservoir sampling, which selects a uniform random sample of a given size from an input stream of an unknown size. Reservoir sampling has been used in many database applications including clustering, data warehousing, spatial data management, and approximate query processing.

Conventional reservoir sampling selects a uniform random sample of a fixed size, without replacement, from an input stream of an unknown size (see Algorithm 1, below). Initially, the algorithm places all tuples in the reservoir until the reservoir (of the size of r tuples) becomes full. After that, each $k^{th}$ tuple is sampled with the probability r/k. A sampled tuple replaces a randomly selected tuple in the reservoir. It is easy to verify that the reservoir always holds a uniform random sample of the k tuples seen so far. Conventional reservoir sampling assumes a fixed size reservoir (i.e., the size of a sample is fixed).

---

Algorithm 1: Conventional Reservoir Sampling

---

Inputs: r {reservoir size}
1: k = 0
2: for each tuple arriving from the input stream do
3:     k = k + 1
4:     if k ≦ r then
5:         add the tuple to the reservoir
6:     else
7:         sample the tuple with the probability r/k and replace a randomly selected tuple in the reservoir with the sampled tuple
8:     end if
9: end for

---

In addition to its usefulness in sampling in the context of data streams, uniform random sampling has been extensively used in the database community for evaluating queries approximately. This approximate query evaluation may be necessary due to limited system resources like memory space or computation power. Two types of queries have been mainly considered: 1) aggregation queries and 2) join queries. As between the two types, it is far more challenging for join queries because uniform random sampling of join inputs does not guarantee a uniform random sample of the join output.

In the context of data stream processing, others have addressed that challenge with a focus on streaming out (without retaining) a uniform random sample of the result of a sliding-window join query with limited memory. There are, however, many data stream applications for which such a continuous streaming out is not practical. One example is applications that need a block of tuples (instead of a stream of tuples) to perform some statistical analysis like median, variance, etc. For these applications, there should be a way of retaining a uniform random sample of the join output stream.

Another example comes from the applications that collect results of join queries from wireless sensor networks using a mobile sink. Data collection applications have been extensively addressed in research literature. In these applications, a mobile sink traverses the network and collects data from sensors. Thus, each sensor needs to retain a uniform random sample of the join output, instead of streaming out the sample tuples toward the sink.

A natural solution to keep a uniform random sample of the join output stream is to use reservoir sampling. However, keeping a reservoir sample over stream joins is not trivial since streaming applications can be limited in memory size.

SUMMARY OF THE DISCLOSURE

In one implementation, the present disclosure is directed to a method of maintaining a uniform random sample by a machine. The method includes: establishing in a machine memory a sampling reservoir having a size; receiving a data stream containing sequentially arriving tuples; sampling the data stream so as to store ones of the sequentially arriving tuples in the sampling reservoir so as to create stored tuples; while sampling, adjusting the size of the sampling reservoir in a controlled manner; and after adjusting the size, continuing sampling the data stream and storing ones of the sequentially arriving tuples in the sampling reservoir so as to maintain a sample of the data stream with a certain uniformity confidence.

In a particular example of the immediately foregoing implementation, the machine memory has a limited size and the method further includes: establishing in the machine memory a plurality of sampling reservoirs each having a size;

receiving a plurality of data streams each containing a plurality of sequentially arriving tuples, the plurality of data streams corresponding respectively to the plurality of sampling reservoirs; checking whether the size of any one or more of the plurality of sampling reservoirs should be changed; and for each of the plurality of sampling for which the size should be changed, adjusting the size of that one of the plurality of sampling reservoirs as a function of the limited size of the machine memory.

In another implementation, the present disclosure is directed to a method of performing join sampling by a machine. The method includes: establishing in a machine memory a sampling reservoir having a sampling reservoir size, and a join buffer having a join buffer size; simultaneously receiving a plurality of data streams; join-sampling the plurality of data stream so as to create a plurality of join-sample tuples; storing the plurality of join-sample tuples in the join buffer; reservoir sampling the plurality of join-sample tuples so as to create a plurality of reservoir sample tuples; and storing the plurality of reservoir sample tuples in the sampling reservoir.

In a further implementation, the present disclosure is directed to a computer-readable medium containing computer-executable instructions for performing a method of maintaining a uniform random sample. The computer-executable instructions include: a first set of computer-executable instructions for receiving a data stream containing sequentially arriving tuples; a second set of computer-executable instructions for sampling the data stream so as to store ones of the sequentially arriving tuples in a sampling reservoir so as to create stored tuples; a third set of computer-executable instructions for adjusting the size of the sampling reservoir in a controlled manner while sampling; and a fourth set of computer-executable instructions for continuing sampling the data stream after the adjusting of the size and storing ones of the sequentially arriving tuples in the sampling reservoir so as to maintain a sample of the data stream with a certain uniformity confidence.

In a particular example of the immediately foregoing implementation, the machine memory has a limited size and the computer-executable instructions further include: computer-executable instructions for establishing in the machine memory a plurality of sampling reservoirs each having a size; computer-executable instructions for receiving a plurality of data streams each containing a plurality of sequentially arriving tuples, the plurality of data streams corresponding respectively to the plurality of sampling reservoirs; computer-executable instructions for checking whether the size of any one or more of the plurality of sampling reservoirs should be changed; and computer-executable instructions that, for each of the plurality of sampling reservoirs for which the size should be changed, adjusts the size of that one of the plurality of sampling reservoirs as a function of the limited size of the machine memory.

In yet another implementation, the present disclosure is directed to a computer-readable medium containing computer-executable instructions for performing a method of maintaining a uniform random sample. The computer-executable instructions include: a first set of computer-executable instructions for establishing in a machine memory a sampling reservoir, having a sampling reservoir size, and a join buffer having a join buffer size; a second set of computer-executable instructions for simultaneously receiving a plurality of data streams; a third set of computer-executable instructions for join-sampling the plurality of data stream so as to create a plurality of join-sample tuples; a fourth set of computer-executable instructions for storing the plurality of join-sample tuples in the join buffer; a fifth set of computer-executable instructions for reservoir sampling the plurality of join-sample tuples so as to create a plurality of reservoir sample tuples; and a sixth set of computer-executable instructions for storing the plurality of reservoir sample tuples in the sampling reservoir.

In still another implementation, the present disclosure is directed to a system that includes: at least one processor for processing computer-executable instructions; and memory functionally connected to the at least one processor, the memory containing computer-executable instructions for performing a method of maintaining a uniform random sample. The computer executable instructions include: a first set of computer-executable instructions for receiving a data stream containing sequentially arriving tuples; a second set of computer-executable instructions for sampling the data stream so as to store ones of the sequentially arriving tuples in a sampling reservoir so as to create stored tuples; a third set of computer-executable instructions for adjusting the size of the sampling reservoir in a controlled manner while sampling; and a fourth set of computer-executable instructions for continuing sampling the data stream after the adjusting of the size and storing ones of the sequentially arriving tuples in the sampling reservoir so as to maintain a sample of the data stream with a certain uniformity confidence.

In a particular example of the immediately foregoing implementation, the memory includes a portion having a limited size and further contains: computer-executable instructions for establishing in the portion of the memory a plurality of sampling reservoirs each having a size; computer-executable instructions for receiving a plurality of data streams each containing a plurality of sequentially arriving tuples, the plurality of data streams corresponding respectively to the plurality of sampling reservoirs computer-executable instructions for checking whether the size of any one or more of the plurality of sampling reservoirs should be changed; and computer-executable instructions that, for each of the plurality of sampling reservoirs for which the size should be changed, adjusts the size of that one of the plurality of sampling reservoirs as a function of the limited size of the portion of the memory.

In yet still another implementation, the present disclosure is directed to a system that includes: at least one processor for processing computer-executable instructions; and memory functionally connected to the at least one processor, the memory containing computer-executable instructions for performing a method of maintaining a uniform random sample. The computer executable instructions include: a first set of computer-executable instructions for establishing in a machine memory a sampling reservoir, having a sampling reservoir size, and a join buffer having a join buffer size; a second set of computer-executable instructions for simultaneously receiving a plurality of data streams; a third set of computer-executable instructions for join-sampling the plurality of data stream so as to create a plurality of join-sample tuples; a fourth set of computer-executable instructions for storing the plurality of join-sample tuples in the join buffer; a fifth set of computer-executable instructions for reservoir sampling the plurality of join-sample tuples so as to create a plurality of reservoir sample tuples; and a sixth set of computer-executable instructions for storing the plurality of reservoir sample tuples in the sampling reservoir.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION

The present invention relates to the development by the present inventors of novel algorithms for reservoir sampling of data streams and stream joins, as well as to systems and methods that implement these algorithms. The novel algorithms include adaptive reservoir sampling, for single and multiple reservoirs, in which the size of the reservoir(s) at issue is/are dynamically increased and/or decreased in size during the sampling. The novel algorithms also include fixed and progressive (increasing in size) reservoir join sampling. These algorithms, as well as examples of implementations of these algorithms in systems and methods, are described below in detail in the following sections.

Prior to proceeding, however, it is useful at this point to introduce the notion of "uniformity confidence" (UC) since a number of the specific algorithms presented utilize it in decision-making that addresses tradeoffs inherent in increasing the size of a sampling reservoir. Uniformity confidence is the probability that a sampling algorithm generates a uniform random sample. A sample is a uniform random sample if it is produced using a sampling scheme in which all statistically possible samples of the same size are equally likely to be selected. In this case, we say the uniformity confidence in the sampling algorithm equals 100%. In contrast, if some statistically possible samples cannot be selected using a certain sampling algorithm, then we say the uniformity confidence in the sampling algorithm is below 100%. Thus, we define uniformity confidence as follows:

$$\frac{\text{the number of different samples of the same size possible with the algorithm}}{\text{the number of different samples of the same size possible statistically}} \times 100 \quad \{1\}$$

For reservoir sampling, the uniformity confidence in a reservoir sampling algorithm which produces a sample S of size r (denoted as $S_{[r]}$) is defined as the probability that $S_{[r]}$ is a uniform random sample of all the tuples seen so far. That is, if k tuples have been seen so far, then the uniformity confidence is 100% if and only if every statistically possible $S_{[r]}$ has an equal probability to be selected from the k tuples. As seen below, if the reservoir size is decreased from r to r−δ (δ>0), then there is a way to maintain the sample in the reduced reservoir such that every statistically possible $S_{[r-\delta]}$ has an equal probability of being in the reduced reservoir, whereas if the reservoir size is increased from r to r+δ (δ>0), then some statistically possible $S_{[r+\delta]}$'s cannot be selected.

Adaptive Reservoir Sampling

Figure 1:
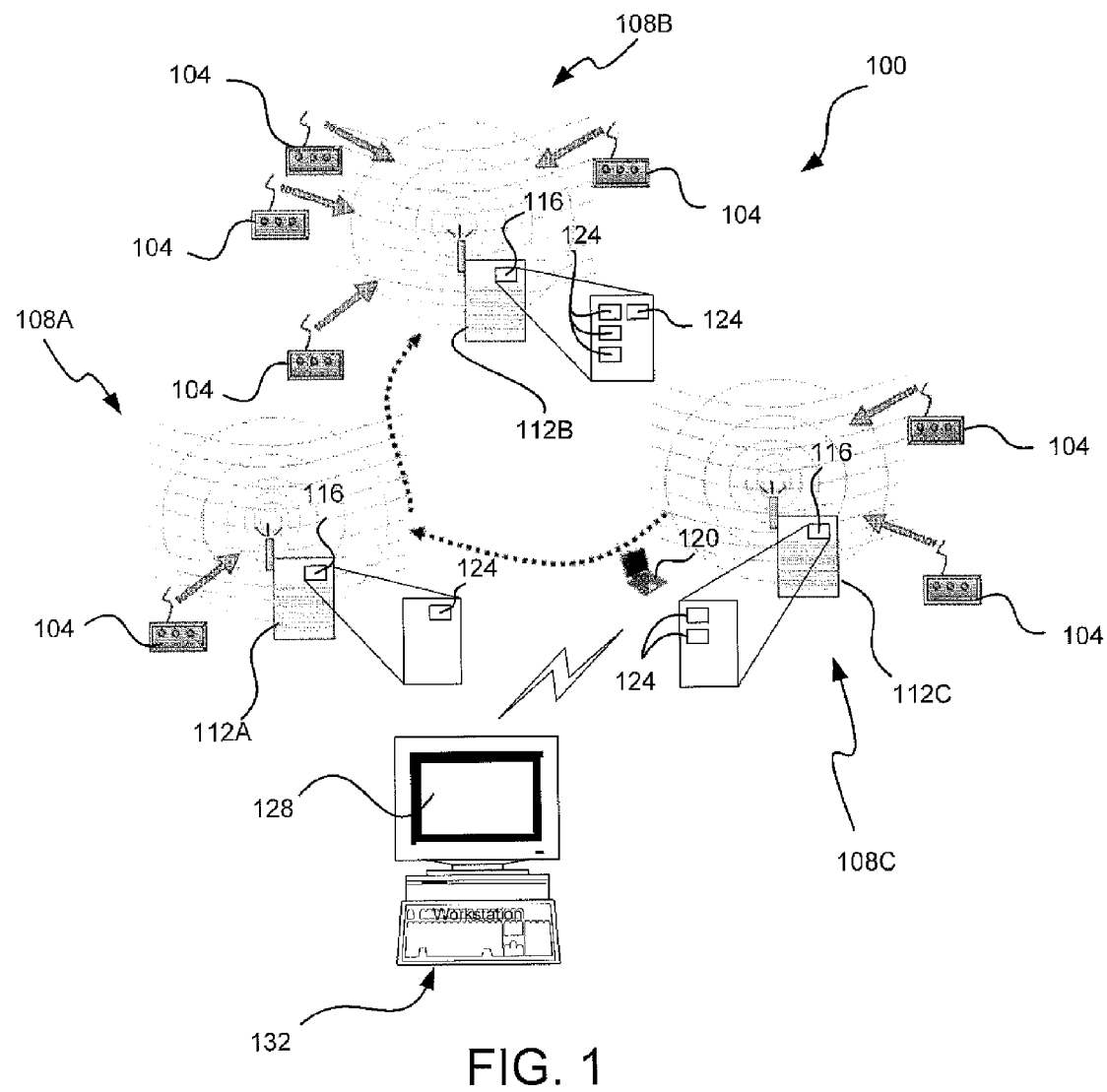
FIG. 1 is a high-level diagram of a wireless sensor network implementing systems and methods of the present disclosure.

There are situations where it would be desirable to change the size of one or more sampling reservoirs dynamically as sampling proceeds. A first example scenario is illustrated in FIG. 1, which shows a wireless sensor network 100 that includes a plurality of wireless sensors 104 distributed in a plurality of spatial clusters, here three clusters 108A-C. For the collection of readings from sensors 104, each cluster 108A-C has an associated proxy 112A-C that includes a memory 116 that stores sensor readings from the sensors of that cluster and acts as a data cache. A mobile sink 120 navigates network 100 to periodically collect data from proxies 112A-C. Memory 116 of each proxy 112A-C, however, is limited and, therefore, may store only samples of the readings. Each proxy 112A-C may very well keep multiple reservoir samples 124, one for each sensor 104 in the corresponding cluster 108A-C. A software application, for example, a monitoring and analysis application 128 aboard a computer 132, such as a general purpose computer (e.g., laptop, desktop, server, etc.), may demand that the size of a reservoir be in proportion to the number of readings generated so far by the corresponding sensor. If, for example, the sampling rates of sensors 104 change over time, the reservoir sizes should be adjusted dynamically as the sampling rates of the sensors change.

As those skilled in the art will readily appreciate, in the foregoing example each sensor 104 may include one or more of any type of transducer or other measurement device suitable for sensing the desired state(s) at the location of that sensor. Examples of such device types include, but are not limited to, temperature transducers, motion transducers (e.g. accelerometers), displacement transducers, flow transducers, speed transducers, pressure transducers, moisture transducers, chemical sensing transducers, photo transducers, voltage sensors, electrical current sensors, electrical power sensors, and radiation transducers, among many others. Wireless sensors, proxies, mobile sinks and computers suitable for use, respectively, as wireless sensors 104, proxies 112A-C, mobile sink 120 and computer 132, are well known in the art and therefore need not be described in any detail herein for those skilled in the art to implement concepts of the present invention to their fullest scope. The same holds true for actual software applications that correspond to software application 128.

As another example of a situation in which it could be beneficial to dynamically change the size of a sampling reservoir is approximate query processing. For instance, others have adapted reservoir sampling to sample the result of a join operation. Random sampling over joins requires information about the statistics of base relations. However, such information may not be available and, therefore, it may not be possible to pre-estimate the size of an intermediate join result and accordingly pre-allocate an appropriate reservoir size. Even if available, such statistics are often inaccurate at run time, and the size of an intermediate join result may be much larger than estimated. If, while the sampling is in progress, the reservoir size becomes too small to represent the intermediate join result adequately, then the reservoir size should be increased. Furthermore, if the total available memory for the query processor is limited, increasing the size of a reservoir would force the release of some memory elsewhere, possibly decreasing the size of another reservoir.

In a further example, periodic queries, a variation of continuous queries, are appropriate for many real-time streaming applications, such as security surveillance and health monitoring. In the periodic query model, once a query is registered to the system, query instances are instantiated periodically by the system. Upon instantiation, a query instance takes a snapshot of tuples that arrived since the last instantiation of the query. Consider a common situation in which, due to the nature of data streams and their potentially high arrival rates, a technique like random sampling is used to reduce the stream rate. As the query is instantiated periodically, the system may keep a reservoir sample of stream data arriving between the execution times of two consecutive query instances. If at some point the reservoir size has become too small to represent the stream adequately, the system should provide a way to increase the reservoir size for better representing the stream data at the execution time of the next query instance. Moreover, it is not uncommon that multiple queries run simultaneously in the system. In this case, each query may have its own reservoir sample maintained. Besides, at any point in time, one or more queries can be registered to or expired from the system. In order to adapt to this dynamic change of the query set, the system should be able to adaptively reallocate the memory among all reservoirs of the current query set.

Although in a variety of situations it is desirable to adjust the reservoir size while the sampling is in progress, this adjusting does not come for free. As described below, such an adjustment may have a negative impact on the statistical quality of the sample in terms of the probability of the sample being uniform. Motivated by this observation, the development of algorithms for adaptive-size reservoir sampling over data streams considered the following two main factors: 1) reservoir size (or equivalently sample size) and 2) sample uniformity. An appropriate sample size depends on data characteristics such as the size, mean, and variance of the population. Sample uniformity brings an unbiased representation of the population, and is especially desirable if it is not clear in advance how the sample will be used.

Development of adaptive-size reservoir sampling shows that, on one hand, if the reservoir size decreases, the sample in the reduced reservoir can be maintained with a 100% uniformity confidence. On the other hand, if the reservoir size increases, it is not possible to maintain the sample in the enlarged reservoir with a 100% uniformity confidence, and, in this case, there is a tradeoff between the size of the enlarged reservoir and the uniformity confidence.

The following section presents a novel algorithm (called "adaptive reservoir sampling") for maintaining a reservoir sample for a single reservoir after the reservoir size is adjusted. If the size decreases, the algorithm maintains a sample in the reduced reservoir with a 100% uniformity confidence by randomly evicting tuples from the original reservoir. If the size increases, the algorithm finds the minimum number of incoming tuples that should be considered in the input stream to refill the enlarged reservoir such that the resulting uniformity confidence exceeds a given threshold. Then, the algorithm decides probabilistically on the number of tuples to retain in the enlarged reservoir and randomly evicts the remaining number of tuples. Eventually, the algorithm fills the available room in the enlarged reservoir using the incoming tuples.

Following the presentation of a single-reservoir algorithm, subsequent sections extend the single-reservoir algorithm to an "adaptive multi-reservoir sampling" and describe experiments using real sensor networks data sets. The experimental results demonstrate the adaptivity of the adaptive multi-reservoir sampling algorithm through two sets of experiments. The first set of experiments shows the sizes of multiple reservoirs changing adaptively to the change in the sampling rate of sensors, and the second set of experiments shows the effects of these changes on the samples' uniformity.

Adaptive Reservoir Sampling—Single Reservoir

An algorithm for adaptive reservoir sampling for a single reservoir is as follows:

---

Algorithm 2: Adaptive Reservoir Sampling

Inputs:  r {reservoir size}
        k {number of tuples seen so far}
        $\zeta$ {uniformity confidence threshold}
1: while true do
2:    while reservoir size does not change do
3:       conventional reservoir sampling (Algorithm 1 (Background section, above).
4:    end while
5:    if reservoir size is decreased by $\delta$ then
6:       randomly evicts $\delta$ tuples from the reservoir.
7:    else
8:       {i.e., reservoir size is increased by $\delta$}
9:       Find the minimum value of m (using Equation {3}, below, with the current values of k, r, $\delta$) that causes the UC to exceed $\zeta$.
10:      flip a biased coin to decide on the number, x, of tuples to retain among r tuples already in the reservoir (Equation {4}, below).
11:      randomly evict r − x tuples from the reservoir.

| Algorithm 2: Adaptive Reservoir Sampling |
| --- |
| 12:     select r+δ−x tuples from the incoming m tuples using conventional reservoir sampling (Algorithm 1 (Background section, above). |
| 13:   end if |
| 14: end while |

As mentioned above, using this algorithm to dynamically decrease the size of the reservoir during sampling allows the uniformity confidence to remain 100%, while using the algorithm to dynamically increase the size of the reservoir during sampling results in a uniformity confidence less than 100%, though the decrease in confidence can be controlled by controlling the size increase, and vice versa. Using Equation {1}, above, the effect of decreasing and increasing the size of the reservoir on the uniformity confidence can be demonstrated as follows.

Figure 2:
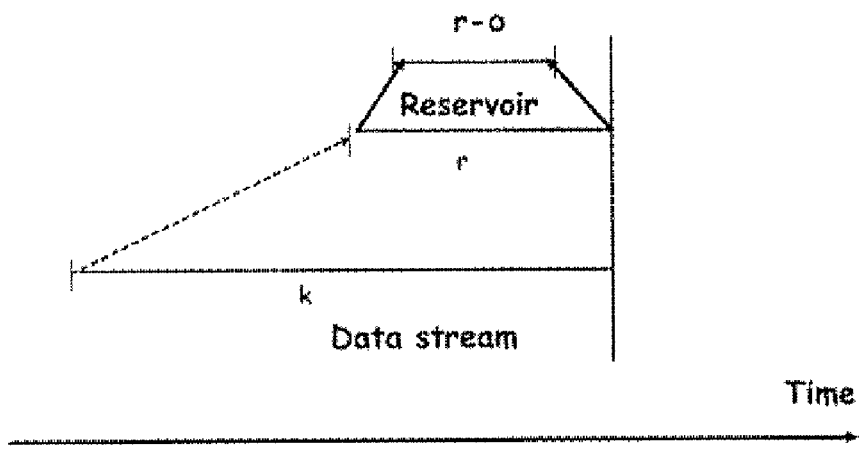
FIG. 2 is a diagram illustrating a decrease in the size of a sampling reservoir during sampling in the context of adaptive reservoir sampling performed in accordance with the present disclosure.

Decreasing the Size of the Reservoir. Suppose the size of a reservoir is decreased from r to r−δ (δ>0) immediately after the $k^{th}$ tuple arrives (see FIG. 2). Then, the sample in the reduced reservoir can be maintained by randomly evicting δ tuples from the original reservoir. With this random eviction in place, there are $$\binom{r}{r-\delta}$$

different $S_{[r-\delta]}$'s that can be selected in the reduced reservoir from the original reservoir. Note that there are $$\binom{k}{r}$$

different $S_{[r]}$'s that can be selected in the original reservoir from the k tuples and there are $$\binom{k-(r-\delta)}{r-(r-\delta)}$$

duplicate $S_{[r-\delta]}$'s that can be selected in the reduced reservoir from the different $S_{[r]}$'s. Therefore, there are $$\left(\binom{k}{r}\binom{r}{r-\delta}\right)\bigg/\binom{k-(r-\delta)}{r-(r-\delta)}$$

different $S_{[r-\delta]}$'s that can be selected in the reduced reservoir from the k tuples. On the other hand, the number of different samples of size r−δ that should be statistically possible from sampling k tuples is $$\binom{k}{r-\delta}.$$

Hence, the uniformity confidence is expressed as follows:

$$UC(k, r, \delta) = \frac{\left(\binom{k}{r}\binom{r}{r-\delta}\right)\big/\binom{k-(r-\delta)}{r-(r-\delta)}}{\binom{k}{r-\delta}} \times 100 = \frac{\binom{k}{r-\delta}}{\binom{k}{r-\delta}} \times 100 \quad \{2\}$$

which clearly shows that the uniformity confidence is 100%.

Figure 3:
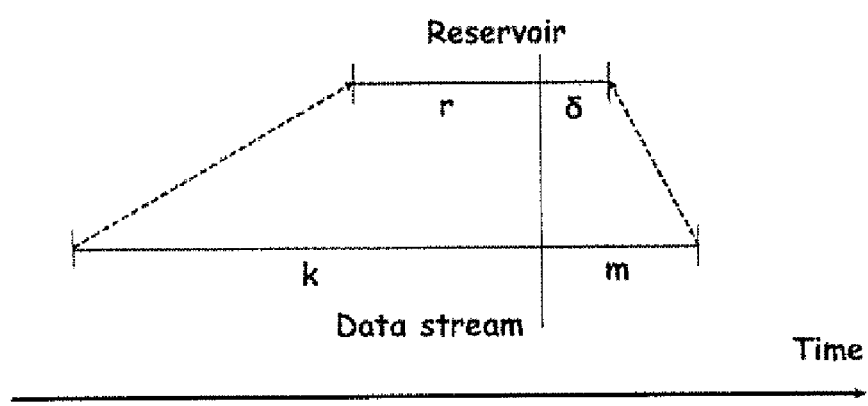
FIG. 3 is a diagram illustrating an increase in the size of a sampling reservoir during sampling in the context of adaptive reservoir sampling performed in accordance with the present disclosure.

Increasing the Size of the Reservoir. Suppose the size of a reservoir is increased from r to r+δ (δ>0) immediately after the $k^{th}$ tuple arrives (see FIG. 3). Then, the reservoir has room for δ additional tuples. Clearly, there is no way to fill this room from sampling the k tuples as they have already passed by. Only incoming tuples can be used to fill the room. The number of incoming tuples used to fill the enlarged reservoir is denoted as m and is called the "uniformity confidence recovery tuple count."

For the sake of better uniformity, some of the r existing tuples are allowed to be evicted probabilistically and replaced by some of the incoming m tuples. In Algorithm 2, the number of tuples evicted (or equivalently, the number of tuples retained) are randomly picked. Clearly, the number of tuples that are retained, x, can be no more than r. Besides, x should not be less than (r+δ)−m if m<r+δ (because otherwise, with all m incoming tuples the enlarged reservoir cannot be refilled), and no less than 0 otherwise. Hence, there can be x tuples, where x∈[max {0, (r+δ)−m}, r], from the k tuples and the other r+δ−x tuples from the m tuples. This eviction scheme allows for $$\binom{k}{x}\binom{m}{r+\delta-x}$$

different $S_{[r+\delta]}$'s for each x in the range [max {0, (r+δ)−m}, r]. On the other hand, the number of different samples of size r+δ that should be statistically possible from sampling k+m tuples is $$\binom{k+m}{r+\delta}.$$

Hence, with the eviction in place, the uniformity confidence is expressed as follows:

$$UC(k, r, \delta, m) = \frac{\sum_{x=max\{0,(r+\delta)-m\}}^{r} \binom{k}{x}\binom{m}{r+\delta-x}}{\binom{k+m}{r+\delta}} \times 100 \quad \{3\}$$

where m≧δ.

Figure 4:
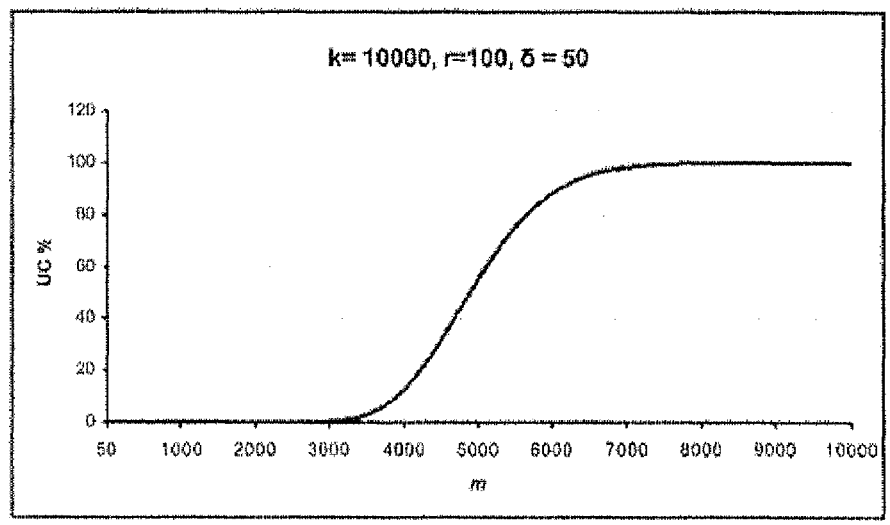
FIG. 4 is a graph of uniformity confidence with respect to the uniformity confidence recovery tuple count, m, for a sampling reservoir of an increasing size.
Figure 5:
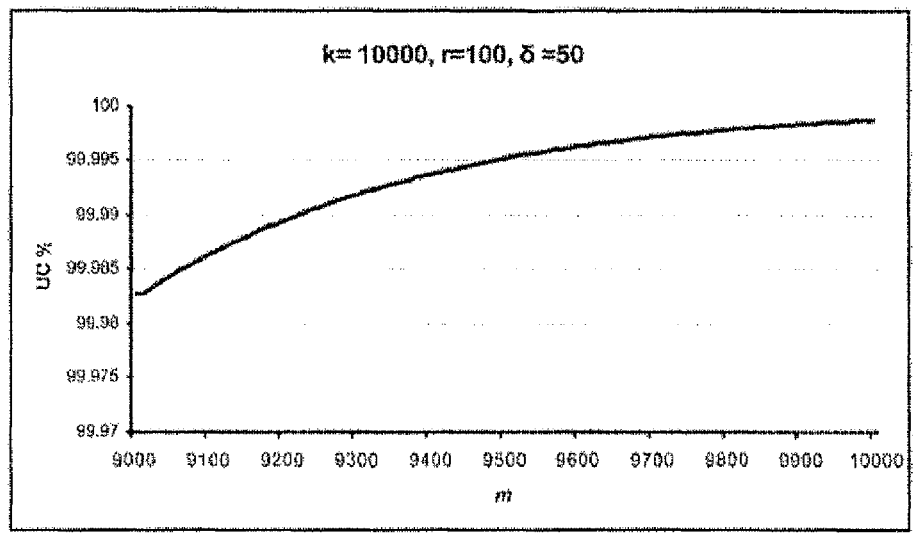
FIG. 5 is a magnified portion of the graph of FIG. 4 for m greater than or equal to 9000.

Examining this formula shows that the uniformity confidence increases monotonously and saturates as m increases. FIG. 4 shows this pattern for one setting of k, r, and δ. Note that the uniformity confidence never reaches 100%, as exemplified by FIG. 5 which magnifies the uniformity confidence curve of FIG. 4 for m≧9000.

Based on the foregoing, the exemplary adaptive reservoir sampling algorithm works as shown in Algorithm 2, above. As long as the size of the reservoir does not change, it uses conventional reservoir sampling to sample the input stream (Line 3). If the reservoir size decreases by δ, the algorithm evicts δ tuples from the reservoir randomly (Line 6). After that, the algorithm continues sampling using the conventional reservoir sampling (Line 3). On the other hand, if the reservoir size increases by δ, the algorithm computes the minimum value of m (using Equation {3}) that causes the uniformity confidence to exceed a given threshold (ζ) (Line 9). Then, the algorithm flips a biased coin to decide on the number of tuples (x) to retain among the r tuples already in the reservoir (Line 10). The probability of choosing the value x, where max {0, (r+δ)−m}≦x≦r, is defined as:

$$p(x) = \frac{\binom{k}{x}\binom{m}{r+\delta-x}}{\binom{k+m}{r+\delta}} \quad \{4\}$$

After that, the algorithm randomly evicts r−x tuples from the reservoir (Line 11) and refills the remaining reservoir space with r+δ−x tuples from the arriving m tuples using conventional reservoir sampling (Line 12). Eventually, the algorithm continues sampling the input stream using the conventional reservoir sampling (Line 3) as if the sample in the enlarged reservoir were a uniform random sample of the k+m tuples.

Adaptive Reservoir Sampling—Multiple Reservoirs

Notations used in this section appear in the following Table 1.

TABLE 1

| Symbol | Description |
| --- | --- |
| v | number of streams (i.e., number of reservoirs) |
| $S_i$ | stream i |
| $R_i$ | the reservoir allocated to $S_i$ |
| M | total available memory for v reservoirs |
| t | current time point |
| $r_i(t)$ | computed size of $R_i$ at t |
| $r_i^M(t)$ | computed size of $R_i$ at t with limited memory M |
| $r_i(t_u)$ | size of $R_i$ adjusted at time point $t_u$ ($t_u < t$) |
| $\delta_i(t)$ | change in the size of $R_i$ at t |
| $k_i(t)$ | number of tuples seen up to t from $S_i$ |
| $m_i(t)$ | number of tuples to be seen from $S_i$, starting from t, to fill an enlarged reservoir $R_i$ |
| $\lambda_i(t)$ | the average stream rate of $S_i$ |
| T | time period left until the next data collection time |
| ζ | uniformity confidence threshold |
| φ | memory adjustment threshold (0 ≦ φ ≦ 1) |

In this section, we extend the adaptive reservoir sampling algorithm for a practical application of multi-reservoir sampling in which samples are collected in memory-limited situations, such as wireless sensor networks using a mobile sink. See FIG. 1 and accompanying description as an example of such a network. Applications of data collection over wireless sensor networks using a mobile sink have recently received significant research attention. These applications take advantage of the mobility to improve the process of data gathering. Again, in such applications, at least one mobile sink roves the network and collects data from sensors in its proximity, thereby reducing the in-network communications and increasing the lifetime of the network. While a wireless sensor network is presented as an example, those skilled in the art will readily appreciate that adaptive multi-reservoir sampling of the present disclosure can be readily implemented in any of a variety of applications, such as health monitoring (for patient care, senior citizen safety, etc.), surveillance (for border security, building security, etc.), power grid monitoring (for grid protection, load distribution, etc.), environmental monitoring (for traffic control, habitat monitoring, etc.), structural diagnostics (for bridge or building monitoring and repair, etc.), and target tracking (for military operation, etc.), among others. As those skilled in the art will appreciate, each of these examples involves the collection of sensor data from multiple sensors that may be provided in a wired or wireless sensor network, or hybrid containing both wired and wireless sensors. Again, FIG. 1 is illustrative of a wireless sensor network that could be used for any of these applications. Those skilled in the art will readily understand the modifications needed to implement the present invention in a wired or hybrid type sensor network.

In this example it is assumed that the processing power of each proxy, such as each proxy 112A-C of FIG. 1, is sufficient to carry out the required computations. For this scenario, an adaptive multi-reservoir sampling algorithm is based on the following key ideas. First, an objective of the algorithm is to adaptively adjust the memory allocation in each proxy so that the size of each reservoir is allocated in proportion to the number of readings (i.e., tuples) generated so far by the corresponding sensor. More specifically, this objective is to allocate the memory of size M to the reservoirs ($R_1$, $R_2$, . . . , Rv) of v input streams ($S_1$, $S_2$, . . . , Sv) so that at the current time point t, the size $r_i(t)$ of each reservoir $R_i$ is proportional to the total number of tuples, $k_i(t)$, seen so far from $S_i$. The rationale behind this objective is explained below. Second, the algorithm adjusts the memory allocation only if the relative change in the size of at least one reservoir is above a given memory adjustment threshold and the resulting uniformity confidence for all reservoirs exceeds a given uniformity confidence threshold.

Three criteria can be used to determine a statistically appropriate sample size for a given population. These criteria are the confidence interval, the confidence level, and the degree of variability in the population. Confidence interval is the range in which the true value of the population is estimated to be. Confidence level is the probability value associated with a confidence interval. Degree of variability in the population is the degree in which the attributes being measured are distributed throughout the population. A more heterogeneous population requires a larger sample to achieve a given confidence interval. Based on these criteria, the following simplified formula for calculating a statistically appropriate sample size is provided, assuming 95% confidence level and 50% degree of variability (note that 50% indicates the maximum variability in a population):

$$n = \frac{N}{1 + Ne^2} \quad \{5\}$$

where n is the sample size, N is the population size, and e is 1−confidence interval.

Adapting this formula to our problem, we compute the size $r_i(t)$ of $R_i$ as:

$$r_i(t) = \frac{k_i(t)}{1 + k_i(t)e^2} \quad \{6\}$$

subject to the following limit on the total memory M:

$$\sum_{i=1}^{v} r_i(t) \leq M \quad \{7\}$$

It is assumed that M may not be large enough for all reservoirs. In this case, we use the heuristic of allocating the memory to each reservoir $R_i$ in proportion to the value of $r_i(t)$ computed using Equation {6}. That is:

$$r_i^M(t) = \left\lfloor M\left(\frac{r_i(t)}{\sum_{i=1}^{v} r_i(t)}\right)\right\rfloor \quad \{8\}$$

At the current time point t, this computed reservoir size $r_i^M(t)$ may be different from the reservoir size $r_i(t_u)$ adjusted at time point $t_u$ ($t_u < t$). Let $\delta_i(t)$ denotes the difference. As concluded above, if $\delta_i(t) < 0$, the uniformity confidence is 100%. In contrast, if $\delta_i(t) > 0$, the uniformity confidence is below 100%; in this case, as in Algorithm 2, the sample is maintained in an enlarged reservoir $R_i$ using incoming tuples from the input stream. In the present problem formulation, the number of incoming tuples $m_i(t)$ used to fill an enlarged reservoir $R_i$ is computed as a product of the average stream rate, $\lambda_i(t)$, and the time period, T, left to the next data collection time as follows:

$$m_i(t) = \lambda_i(t) \times T \quad \{9\}$$

For an enlarged reservoir $R_i$, the uniformity confidence expressed in Equation {3} is refined here as follows:

$$UC_i(k_i(t), r_i(t_u), \delta_i(t), m_i(t)) = \quad \{10\}$$

$$\frac{\sum_{x=max\{0,(r_i(t_u)+\delta_i(t))-m_i(t)\}}^{r_i(t_u)} \binom{k_i(t)}{x}\binom{m_i(t)}{r_i(t_u)+\delta_i(t)-x}}{\binom{k_i(t)+m_i(t)}{r_i(t_u)+\delta_i(t)}} \times 100$$

where $m_i(t) > \delta_i(t)$.

To control the frequency of memory allocation adjustment, we consider the adjustment only if the relative change in the computed size (Equation {8}) exceeds a given threshold (denoted as $\varphi$) for some $R_i$, that is, the adjustment is considered if Equation {11} holds for some $i \in \{1, 2, \ldots v\}$.

$$\frac{|r_i^M(t) - r_i(t_u)|}{r_i(t_u)} > \varphi \quad \{11\}$$

where $0 \leq \varphi \leq 1$.

In view of the foregoing, an exemplary adaptive multi-reservoir algorithm is as follows:

---
Algorithm 3: Adaptive Multi-Reservoir Sampling
---
Inputs: $\zeta$, $\varphi$, M, T, $\{r_1(t_u), r_2(t_u), \ldots, r_v(t_u)\}$, $\{k_1(t), k_2(t), \ldots, k_v(t)\}$, $\{\lambda_1(t), \lambda_2(t), \ldots, \lambda_v(t)\}$
1: while true do
2:  while there are no tuples arriving from any stream do
3:   {do nothing.}

-continued

---
Algorithm 3: Adaptive Multi-Reservoir Sampling
---
4:  end while
    {one or more tuples arrived from some streams}
5:  compute $r_i(t)$ (Equation {6}) for the streams from which tuples arrived.
6:  for each $R_i \in \{R_1, R_2, \ldots, R_v\}$ do
7:   compute $r_i^M(t)$ (Equation {8}).
8:   compute $\delta_i(t) = r_i^M(t) - r_i(t_u)$.
9:  end for
10: if Equation {11} holds for any $R_i \in \{R_1, R_2, \ldots, R_v\}$ then
11:  $L_{reduced}$ = set of all $R_i$ whose $\delta_i(t) < 0$
12:  $L_{enlarged}$ = set of all $R_i$ whose $\delta_i(t) > 0$
13:  compute $m_i(t)$ (Equation {9}) for all $R_i \in L_{enlarged}$.
14:  $L'_{enlarged}$ = set of all $R_i \in L_{enlarged}$ whose $UC_i(k_i(t), r_i(t_u), \delta_i(t), m_i(t)) \leq \zeta$
15:  if $L'_{enlarged}$ is empty then
16:   for each $R_i \in (L_{reduced} \cup L_{enlarged})$ do
17:    if $R_i \in L_{reduced}$ then
18:     randomly evicts $\delta_i(t)$ tuples from $R_i$.
19:    else
20:     flip a biased coin to decide on the number of tuples, x, to retain in $R_i$ (using Equation {4} with $k_i(t)$, $r_i(t_u)$, $\delta_i(t)$, $m_i(t)$ substituting k,r,$\delta$,m, respectively).
21:     randomly evict $r_i(t_u) - x$ tuples from $R_i$.
22:     select $r_i(t_u) + \delta_i(t) - x$ tuples from the incoming $m_i(t)$ tuples using Algorithm 1 (Background section, above).
23:    end if
24:    $r_i(t_u) = r_i^M(t)$
25:   end for
26:  end if
27: end if
28: end while Based on the foregoing problem formulation, Algorithm 3 works as follows. As long as there are no tuples arriving from any stream, the algorithm stays idle (Lines 2-4). Upon the arrival of a new tuple from any stream, it computes $r_i(t)$ for those streams from which tuples arrived (Line 5) and computes $r_i^M(t)$ and $\delta_i(t)$ for all streams (Lines 6-9). Then, it checks if the relative change in the size of any reservoir is larger than the memory adjustment threshold $\varphi$ (using Equation {11}) (Line 10). If so, it computes $m_i(t)$ for all of the enlarged reservoirs (Lines 12 and 13). Then, it checks if the uniformity confidence computed using Equation {10} exceeds the given threshold for every enlarged reservoir (Lines 14-15). If so, for each of the adjusted reservoirs, it applies the corresponding steps of the adaptive reservoir sampling algorithm (see Algorithm 2), and updates $r_i(t_u)$ to the current computed reservoir size $r_i^M(t)$ (Lines 16-25).

Adaptive Reservoir Sampling—Experimental Evaluation

The purpose of this evaluation is to empirically examine the adaptivity of the exemplary multi-reservoir sampling algorithm (Algorithm 3, above) with regard to reservoir size and sample uniformity. Two sets of experiments were conducted. The objective of the first set of experiments was to observe how the reservoirs sizes change as data arrive. The objective of the second set of experiments was to observe the uniformity of the reservoir samples as the reservoirs sizes change.

Data Setup. We use a real data set collected from sensors deployed in a research lab over a period of about five weeks. Sensors mounted with weather boards collected timestamped topology information, along with humidity, temperature, light and voltage values once every 31 seconds. Collection of data was done using the TinyDB in-network query processing system, built on a TinyOS platform. (TinyDB and TinyOS are research components that evolved out of laboratories of Intel-Research Berkeley and University of California Berkeley.)

Figure 6:
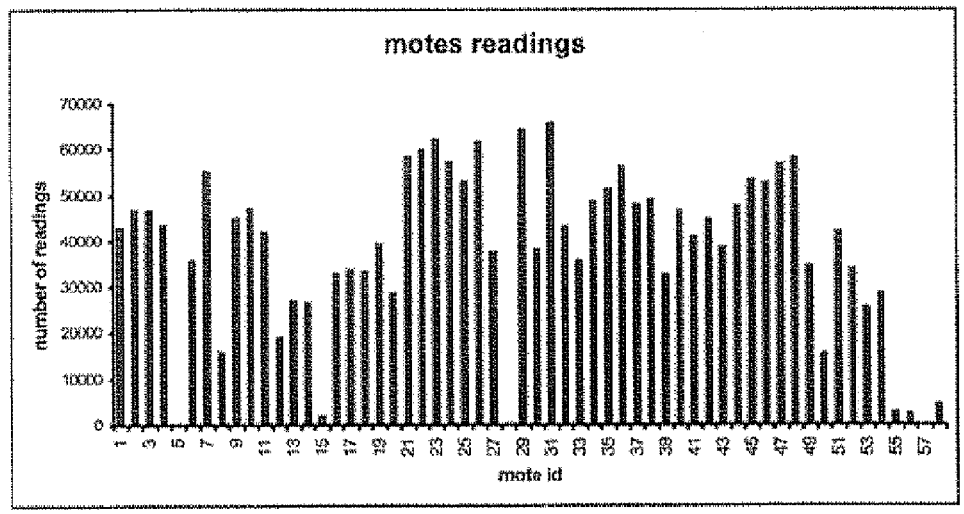
FIG. 6 is a graph of the total number of readings versus mote identifier for a plurality of motes used in an experiment to evaluate performance of an adaptive multi-reservoir sampling algorithm of the present disclosure.

The resulting data file includes a log of about 2.3 million readings collected from these sensors. The schema of records was (date: yyyy-mm-dd, time: hh:mm:ss.xxx, epoch:int, moteid: int, temperature: real, humidity: real, light:real, voltage:real). In this schema, epoch was a monotonically increasing sequence number unique for each mote. Moteid ranged from 1 to 58. Data from three motes (of ID=5, ID=28, and ID=57) had incomplete readings, and thus were discarded. This left readings from 55 motes used in the experiments. (FIG. 6 reports the total number of readings from each mote.) Temperature is in degrees Celsius. Humidity is temperature-corrected relative humidity, ranging from 0 to 100%. Light is in Lux. Voltage is expressed in volts, ranging from 2.0 to 3.0 volts.

Algorithm setup. In Algorithm 3, the uniformity confidence threshold $\zeta$ was set to 0.90. It is believed that this value is adequately large to constrain the frequency of adjusting the memory allocation. To check the effect of the total available memory size on the frequency of change in reservoir sizes, we ranged the value of M from 1000 (tuples) to 5000 (tuples) and range the memory adjustment threshold $\phi$ from 0.1 to 0.5. Readings acquired for the whole first day of the experiment were used in the experiments. Data collection was done every 1 hour and, accordingly, report results on the change in reservoir size and sample uniformity every hour.

Figure 7:
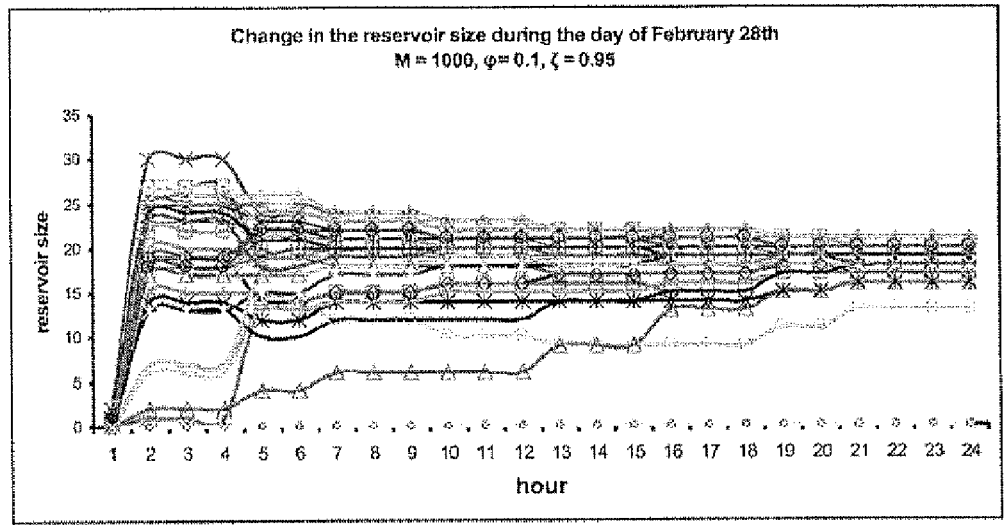
FIG. 7 is a graph of reservoir size versus time for all reservoirs used in the experiment corresponding to FIG. 6 on a particular day with M=1000, $\phi$=0.1 and $\zeta$=0.95.
Figure 8:
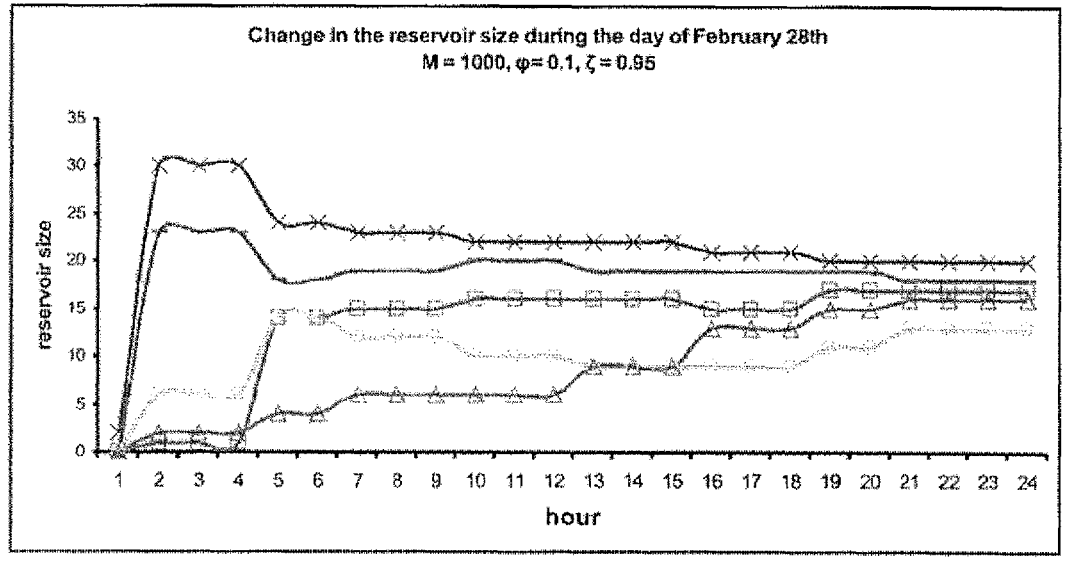
FIG. 8 is a graph of reservoir size versus time for selected reservoirs (mote IDs 2, 15, 31, 49 and 54) used in the experiment corresponding to FIG. 6.

Change in reservoir size. FIG. 7 shows the changes in the sizes of the 55 reservoirs. For better visibility, FIG. 8 shows the changes for 5 selected reservoirs. In the beginning (i.e., by the end of the 2nd hour), the total available memory is enough to store all reading from all motes and, therefore, the reservoir sizes increase linearly. Then, the reservoir sizes started fluctuating. The fluctuations were smooth and small in the first stage (from the 2nd to the 4th hour), larger in the second stage (from the 4th to the 21st hour), and eventually diminished in the last stage (after the 21st hour). This pattern of changes is attributed to the characteristics of data sets used in the experiments. In the first stage, there was no tangible difference between the numbers of readings acquired by different motes. Therefore, reservoir sizes stayed almost constant. In the second stage, the differences started increasing and, therefore, the changes in reservoir sizes became more frequent and more tangible. The saturations in reservoir sizes in the last stage indicate that the number of readings acquired by each mote were large enough and, therefore, did not cause a change in the computed reservoir size (see Equation {6}).

Figure 9:
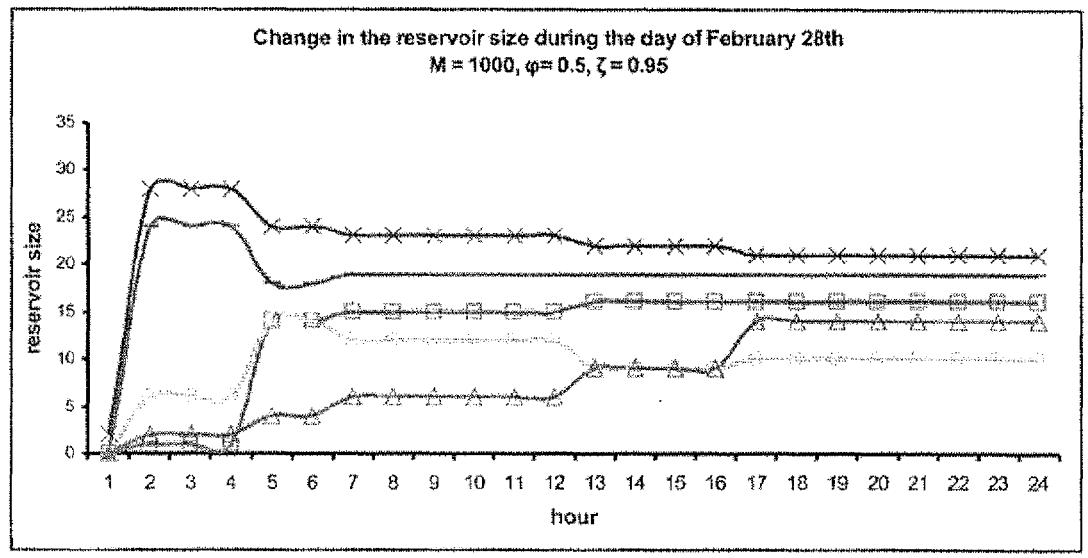
FIG. 9 is a graph of reservoir size versus time for the selected reservoirs (mote IDs 2, 15, 31, 49 and 54) on the particular day with M=1000, $\phi$=0.5 and $\zeta$=0.95.

With a larger value of the memory adjustment threshold $\phi$ (=0.5), FIG. 9 shows a similar pattern except that the changes in reservoir sizes happened less frequently, and saturated earlier. The reason for these observations can be easily seen from Equations {6} and {11}. Results obtained for varying other parameters (M and $\zeta$) show similar patterns, and are omitted due to space constraint.

Sample Uniformity. We used $\chi^2$ statistics as a metric of the sample uniformity. Higher $\chi^2$ indicates lower uniformity and vice versa. For each value v in a domain D, $\chi^2$ statistics measures the relative difference between the observed number of tuples (o(v)) and the expected number of tuples (e(v)) that contain the value v. That is:

$$x^2 = \sum_{\forall v \in D} \frac{(e(v) - o(v))^2}{e(v)} \quad \{12\}$$

In our experiments, we measure $\chi^2$ statistics for the humidity attribute. For this, we round the original real value of humidity to return the closest int to that original value.

Figure 10:
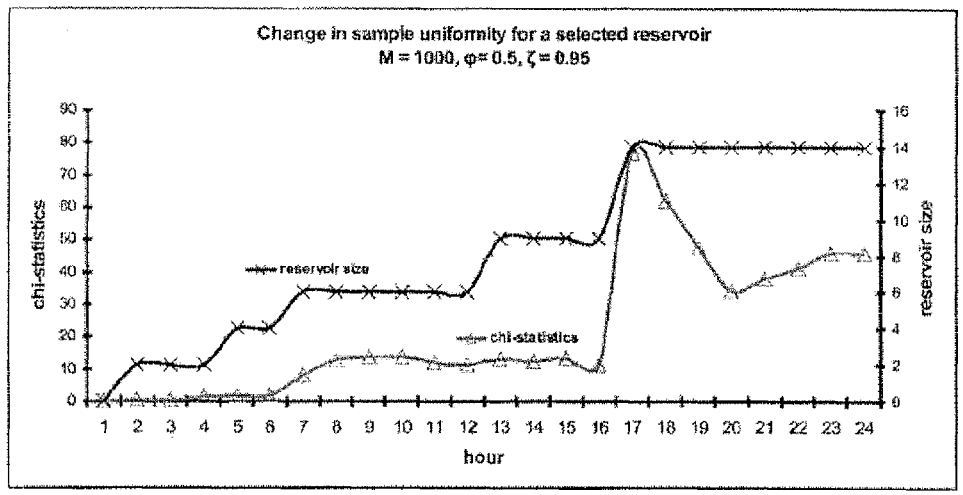
FIG. 10 is a graph of sample uniformity versus time for one reservoir (mote ID 49) with M=1000, $\phi$=0.5 and $\zeta$=0.95.

FIG. 10 shows the changes in size and the resulting sample uniformity for one selected reservoir. It shows that when the reservoir size increases, the sample uniformity degrades (i.e., decreases) and then starts recovering (i.e., increasing). The degree of uniformity degradation and recovery varies due to randomness in the data sets used in experiments.

Join Sampling

As mentioned above, this disclosure also addresses the problem of reservoir sampling over memory-limited stream joins. Novel concepts directed to this problem and two algorithms for performing reservoir sampling on the join result are presented below. These algorithms are referred to herein as the "reservoir join-sampling" (RJS) algorithm and the "progressive reservoir join-sampling" (PRJS) algorithm. In the RJS algorithm, the reservoir size is fixed. As a result, the sample in the reservoir is always a uniform random sample of the join result. Therefore, RJS fits those applications that may use the sample in the reservoir at any time (e.g., continuous queries). This algorithm, however, may not accommodate a memory-limited situation in which the available memory may be too small even for storing tuples in the join buffer. In such a situation, it may be infeasible to allocate the already limited memory to a reservoir with an adequately large size.

The PRJS algorithm, on the other hand, is designed to alleviate this problem by increasing the reservoir size during the sampling process. For this, the conventional reservoir sampling technique of RJS is replaced with what is referred to herein as "progressive reservoir sampling." (As will be seen below, progressive reservoir sampling is the case of adaptive reservoir sampling (see Algorithm 2, above) in which the sampling reservoir size is increased during sampling.) A key idea of PRJS is to exploit the property of reservoir sampling that the sampling probability keeps decreasing for each subsequent tuple. Based on this property, the memory required by the join buffer keeps decreasing during the join-sampling. Therefore, PRJS releases the join buffer memory not needed anymore and allocates it to the reservoir.

Evidently, a larger reservoir sample represents the original join result more closely. It, however, comes at a cost in terms of the uniformity of the sample. Once the reservoir size is increased, the sample's uniformity is damaged. Besides, even after the enlarged reservoir is filled again with new tuples, the sample's uniformity is still not guaranteed, i.e., the sample's uniformity confidence stays below 100%. (See Equation {3}, FIGS. 3-5 and accompanying description.) There is thus a tradeoff that a larger increase of reservoir size leads to lower uniformity confidence after the reservoir is filled again. Therefore, PRJS is suitable for those applications that can be tolerant in terms of the uniformity of the sample. Specifically, it fits those applications that use the sample at a predetermined time (such as applications of data collection over wireless sensor networks, such as wireless sensor network 100 of FIG. 1). Given such a tradeoff, PRJS is designed so that it determines how much the reservoir can be increased given a sample-use time and a uniformity confidence threshold.

The present inventors have performed extensive experiments to evaluate the RJS and PRJS algorithms with respect to the two competing factors (size and uniformity of sample). The inventors have also compared the two algorithms in terms of the aggregation error resulting from applying AVG on the join result. The experimental results confirm understanding of the tradeoffs. The RJS and PRJS algorithms, as well as a description of the experiments, are presented and described below.

Prior to describing the algorithms and experiments, conventional reservoir sampling and progressive reservoir sampling are briefly reviewed and uniform join-sampling will be discussed, as these are used in formulating the RJS and PRJS algorithms presented below. The conventional reservoir sampling algorithm is presented in the Background section above as Algorithm 1. Initially, the algorithm places all tuples in the reservoir until the reservoir (of size r tuples) becomes full. After that, each $k^{th}$ tuple is sampled with the probability r/k. A sampled tuple replaces a randomly selected tuple in the reservoir. This way, the reservoir always holds a uniform random sample of all the tuples seen from the beginning.

As described above relative to Equation {3} and FIGS. 3-5 in connection with adaptive reservoir sampling, when the size of the sample reservoir is increased (i.e., the reservoir size is "progressively" increased), the uniformity confidence UC (Equation {3}) will be less than 100%, increases monotonously and saturates as the uniformity confidence recovery tuple count m increases. As mentioned above, progressive reservoir sampling is one case of adaptive reservoir sampling (Algorithm 2, above) wherein the size of the reservoir is only increased. A progressive reservoir sampling algorithm is as follows:

---
Algorithm 4: Progressive Reservoir Sampling
---

Inputs:    r {reservoir size}
           k {number of tuples seen so far}
           ζ {uniformity confidence threshold}
1: while true do
2:    while reservoir size does not increase do
3:      conventional reservoir sampling (Algorithm 1, Background Section, above).
4:    end while
5:    Find the minimum value of m (using Equation {3} with the current values of k, r, δ) that causes the UC to exceed ζ.
6:    flip a biased coin to decide on the number, x, of tuples to retain among r tuples already in the reservoir (Equation {4}).
7:    randomly evict r − x tuples from the reservoir.
8:    select r + δ − x tuples from the incoming m tuples using conventional reservoir sampling (Algorithm 1, Background section, above).
9: end while

---

Based on the above discussion, the progressive reservoir sampling works as shown in Algorithm 4. As long as the size of the reservoir does not increase, it uses the conventional reservoir sampling to sample the input stream (Line 3). Once the reservoir size increases by δ, the algorithm computes the minimum value of m (using Equation {3}) that causes the UC to exceed a given threshold (ζ) (Line 5). Then, the algorithm flips a biased coin to decide on the number of tuples (x) to retain among the r tuples already in the reservoir (Line 6). The probability of choosing the value x is defined in Equation {4}, above.

After that, the algorithm randomly evicts r−x tuples from the reservoir (Line 7) and refills the remaining reservoir space with r+δ−x tuples from the arriving m tuples using the conventional reservoir sampling (Line 8). Eventually, the algorithm continues sampling the input stream using the conventional reservoir sampling (Line 3) as if the sample in the enlarged reservoir were a uniform random sample of the k+m tuples.

Figure 11:
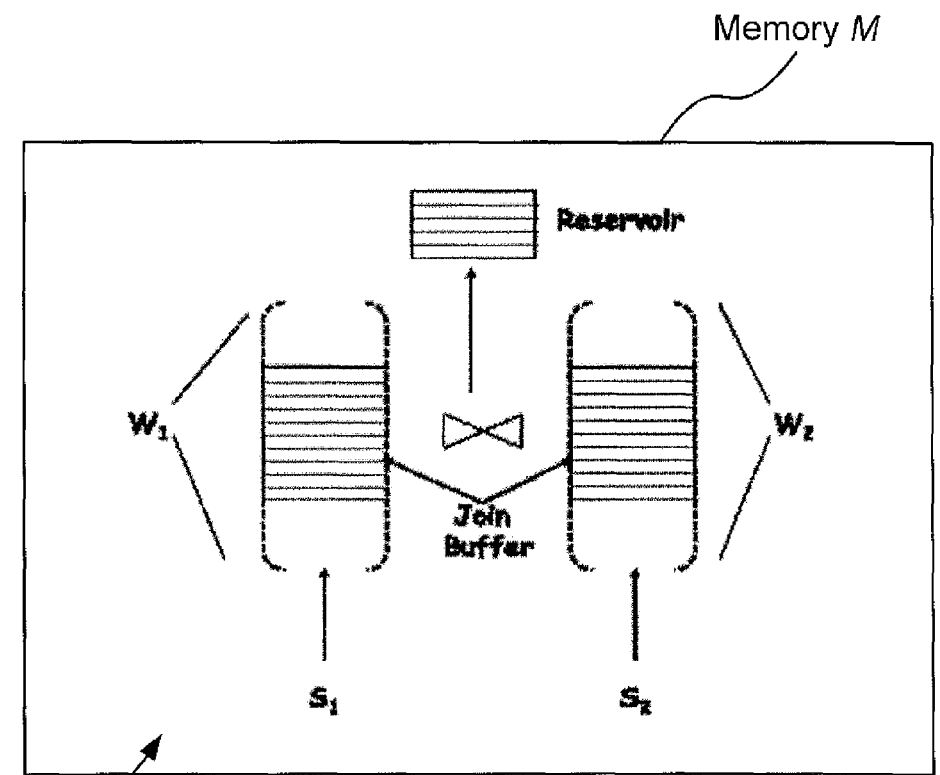
FIG. 11 is a high-level diagram illustrating a join-sampling processing model.

FIG. 11 illustrates a processing model 1100 of join sampling, i.e., uniform random sampling over a (two-way) join output stream. Tuples in the two sliding windows ($W_1$ and $W_2$) on the input data streams ($S_1$ and $S_2$) are equi-joined, i.e., with $S_1 \bowtie_{S_1.A=S_2.A} S_2$. (A is the join attribute.) A sliding window is either time-based or tuple-based. If time-based, at any time τ a window $W_i$ (i=1, 2) contains the tuples of $S_i$ whose timestamp t is in the range $[\tau-|W_i|, \tau]$, where $|W_i|$ denotes the size of $W_i$. If tuple-based, $W_i$ contains the $|W_i|$ tuples that arrived on $S_i$ most recently. The result of a join query is a stream of tuples $s_1 \| s_2$ (i.e., concatenation of $s_1$ and $s_2$) where $s_1$ is a tuple in $S_1$, $s_2$ is a tuple in $S_2$, and $s_1.A = s_2.A$.

Every join-result tuple may be classified as either an $S_1$-probe join tuple or an $S_2$-probe join tuple. When a new tuple $s_1$ arrives on $S_1$ and is joined with a tuple $s_2 \in W_2$, $s_1$ is said to produce an $S_2$-probe join tuple. An $S_1$-probe join tuple is defined symmetrically. A tuple $s_1 \in S_1$ may first produce $S_2$-probe join tuples when it arrives. Then, before it expires from $W_1$, it may produce $S_1$-probe join tuples with tuples newly arriving on $S_2$. $n_1(s_1)$ is a function which returns the number of $S_1$-probe join tuples produced by a tuple $s_1 \in S_1$ before it expires from $W_1$. $n_2(s_2)$ is defined symmetrically.

Tuples arrive in a data stream in a monotonically increasing order of the timestamp. In other words, there is no out of order arrival. The available memory M is limited, and insufficient for the join buffer to hold all tuples of the current sliding windows. It is assumed the initial reservoir size, r, is given. Under this join-sampling processing model, the present inventors have observed that as time passes memory requirement on the join buffer can be lowered and memory from the join buffer can be transferred to the reservoir. This makes the results of progressive reservoir sampling applicable to this processing model.

As will be seen in the following sections, each of the new RJS and PRJS algorithms may be considered to have two phases: 1) a join sampling phase and 2) a reservoir sampling phase. The sampling probabilities used in the first phase are denoted as $p_1$ and the sampling probability used in the second phase are denoted as $p_2$. In the specific RJS and PRJS algorithms presented below, the join sampling phase utilizes a particular uniform join-sampling algorithm known as the "UNIFORM algorithm." The UNIFORM algorithm (Algorithm 5) appears immediately below.

---
Algorithm 5: Uniform Join-Sampling (UNIFORM)
---

1:    for each $s_2$ in $W_2$ where $s_2.A = s_1.A$ do
2:      $s_2$.num = $s_2$.num + 1
3:      if $s_2$.num = $s_2$.next then
4:        output $s_1 \| s_2$
5:        decide on the next $s_1$ to join with $s_2$
6:      end if
7:    end for
8:    pick X ~ G | ($p_1$) {geometric distribution}
9:    $s_1$.next = $s_1$.num + X
10: if $s_1$.next > $n_1(s_1)$ then
11:    discard $s_1$
12: end if

---

The UNIFORM algorithm streams out a uniform random sample of the result of a sliding-window join query in a memory limited stream environment. Algorithm 5 outlines the steps of the algorithm for one-way join from $S_1$ to $S_2$. (Join in the opposite, from $S_1$ to $S_2$, is symmetric.) The basic assumption of the algorithm is that $n_i(s_1)$ (i=1, 2) (i.e., the number of $S_i$-probe join tuples produced by a tuple $s_i \in S_i$ before it expires from $W_i$ (see Table 2, below)) is known. The algorithm works with two prediction models that provide $n_1(s_1)$: 1) a frequency-based model and 2) an age-based model. The frequency-based model assumes that, given a domain D of the join attribute A, for each value v∈D a fixed fraction $f_1(v)$ of the tuples arriving on $S_1$ and a fixed fraction $f_2(v)$ of the tuples arriving on $S_2$ have value v of the attribute A. The age-based model assumes that for a tuple $s_1 \epsilon S_1$ the $S_1$-probe join tuples produced by $s_1$ satisfies the conditions that 1) the number of $S_1$-probe join tuples produced by $s_1$ is a constant independent of $s_1$ and 2) out of the $n_1(s_1)$ $S_1$-probe join tuples of $s_1$, a certain number of tuples is produced when $s_1$ is between the age g−1 and g. These definitions are symmetric for a tuple $s_2 \epsilon S_2$. The choice of a predictive model is not important to the novelty of concepts disclosed herein; thus, without loss of generality, the frequency-based model is used in the rest of this disclosure.

For the frequency-based model, $n_1(s_1) = \lambda_2 \times W_1 \times f_2(S_1 \cdot A)$, the join sampling probability $p_1$ is computed by first obtaining the expected memory usage (i.e., the expected number of tuples retained in the join buffer) in terms of $p_1$ and, then, equate this to the amount of memory available for performing the join and solving it for $p_1$. The expected memory usage of $W_1$ thus obtained as:

$$\lambda_1 W_1 \sum_{v \in D} f_1(v) \left(1 - \frac{(1-p_1)(1-(1-p_1)^{\lambda_2 W_1 f_2(v)})}{p_1 \lambda_2 W_1 f_2(v)}\right) \quad \{13\}$$

A symmetric expression holds for the expected memory usage of $W_2$, assuming the same sampling probability $p_1$ for the $S_2$-probe join tuples. That is, $$\lambda_2 W_2 \sum_{v \in D} f_2(v) \left(1 - \frac{(1-p_1)(1-(1-p_1)^{\lambda_1 W_2 f_1(v)})}{p_1 \lambda_1 W_2 f_1(v)}\right) \quad \{14\}$$

Summation of these two expressions gives the total memory usage for $W_1 \bowtie W_2$.

Given $p_1$, the algorithm proceeds as shown in Algorithm 5. When a tuple $s_1$ arrives on $S_1$, the UNIFORM algorithm looks for every $s_2 \epsilon W_2$ such that $s_1 \cdot A = s_2 \cdot A$ (Line 1). Then, it outputs $s_1 \| s_2$ if this $s_1$ is the tuple $s_2$ is waiting for the output of the next sample tuple (Line 4), and then decides on the next $s_1$ for $s_2$ (Line 5). Moreover, once $s_1$ arrives on $S_1$, the UNIFORM algorithm flips a coin with bias $p_1$ to decide the next $S_1$-probe join tuple of $s_1$ (Lines 8-9). To do that, the UNIFORM algorithm picks X at random from the geometric distribution with parameter $p_1$, $G(p_1)$. If all remaining $S_1$-probe join tuples of $s_1$ are rejected in the coin flips, $s_1$ is discarded (Lines 10-12).

Notations used in this section appear in the following Table 2.

TABLE 2

| Symbol | Description |
| --- | --- |
| $S_i$ | Data stream i (i = 1,2) |
| $\lambda_i$ | Rate of stream $S_i$ |
| $s_i$ | Tuple arriving in stream $S_i$ |
| $W_i$ | Sliding window on stream $S_i$ |
| A | Join attribute (common to $S_1$ and $S_2$) |
| $S_i$-probe | Join tuple produced by $s_i \in W_i$ |
| $n_i(s_i)$ | Number of $S_i$-probe join tuples produced by a tuple $s_i \in S_i$ before it expires from $W_i$ |
| S | Sample in a reservoir |
| r | Initial reservoir size |
| δ | Increment of a reservoir size |
| k | Number of tuples seen so far in an input stream |
| l | Number of tuples that would be generated without join-sampling by the time the reservoir sample will be used (or collected) |
| RC | Reservoir refill confidence |
| ξ | Reservoir refill confidence threshold |

TABLE 2-continued

| Symbol | Description |
| --- | --- |
| UC | Uniformity confidence in a reservoir sample |
| ζ | Uniformity confidence threshold |
| m | Uniformity confidence recovery tuple count, i.e., number of tuples to be seen in an input stream of the progressive reservoir sampling until UC for the enlarged reservoir reaches ζ |
| x | Number of tuples to be selected from k after increasing the reservoir size |
| y | Number of tuples to be selected from m after increasing the reservoir size |
| $p_1$ | Join sampling probability in the first phase of the algorithms RJS and PRJS |
| $p_2$ | Reservoir sampling probability in the second phase of the algorithms RJS and PRJS |

Join Sampling—Reservoir Join Sampling

Based on the foregoing, immediately following is a specific example of an RJS algorithm (Algorithm 6).

---

Algorithm 6: Reservoir Join-Sampling (RJS)

1: k = 0
2: for each tuple output by UNIFORM do
3:   if k ≦ r then
4:     add the tuple to the reservoir
5:   else
6:     sample the tuple with the probability $p_2 = (r/(k+1))/p_1$
7:   end if
8:   k = k + (1/$p_1$)
9: end for

---

Algorithm 6 applies reservoir sampling on the output of the UNIFORM algorithm. Thus, it uses a fixed size reservoir and always holds a uniform random sample in the reservoir. Algorithm 6 outlines the steps of RJS. Given a fixed reservoir of size r, the first r join-sample tuples produced by the UNIFORM algorithm are directly placed in the reservoir (Lines 3-4). After that, each join-sample tuple is re-sampled using reservoir sampling with a probability $p_2$ so that a $p_1 \times p_2 = r/(k+1)$, that is, $p_2 = (r/(k+1))/p_1$ (Line 6).

k is an index of the original join output tuples that would be generated from the join. Since join-sampling selects only a portion of them, the value of k should be estimated. This estimation may be done as follows. When a tuple $s_1$ produces an $S_2$-probe join tuple, $1/p_1$ tuples would be generated on average from the exact join since the algorithm samples a join result tuple with probability $p_1$. Therefore, $k = k + (1/p_1)$ (Line 8). This estimation process is symmetric for $S_1$-probe join tuples.

Join Sampling—Progressive Reservoir Join Sampling

Also based on the foregoing, immediately following is a specific example of a PRJS algorithm (Algorithm 7).

---

Algorithm 7: Progressive Reservoir Join-Sampling (PRJS)

1: k = 0
   {Initially, the memory utilization of the join buffer is 100%.}
2: while the memory utilization of the join buffer does not decrease do
3:   for each tuple output by the UNIFORM algorithm do
4:     if k ≦ r then
5:       add the tuple to the reservoir
6:     else
7:       sample the tuple with a probability $p_2 = (r/(k+1))/p_1$
8:     end if
9:     k = k + (1/$p_1$)

-continued

Algorithm 7: Progressive Reservoir Join-Sampling (PRJS)

```
10:      set p₁ = r/(k + 1) {for the next incoming tuple}
11:      re-compute the memory utilization of the join buffer using
         Equations {13} and {14}
12:   end for
13: end while
14: while (RC(m) ≧ ξ)
         and (UC(Sr+δ) ≧ ζ)
         and (m ≧ (x + y) − (p₁(k + 1))) do
15:      decrease p₁ by a specified constant value
16:      re-compute the memory utilization of the join buffer using
         Equations {13} and {14}
17:      increase δ by the amount of unused memory
18: end while
19: while (RC(m) < ξ)
         or (UC(Sr+δ) < ζ)
         or (m < (x + y) − (p₁(k + 1))) do
20:      δ = δ − 1
21:      if δ = 0 then
22:         return
23:      end if
24: end while
25: release δ memory units from the join buffer and allocate the released
    memory to the reservoir.
26: flip a biased coin to decide on x and y (Equation {4})
27: randomly evict r − x sample tuples from the reservoir
28: get y sample tuples out of m using Algorithm 1 (Background section,
    above)
29: continue sampling the input stream using Algorithm 1 (Background
    section, above)
```

A key idea behind PRJS and Algorithm 7 is to utilize the property of reservoir sampling that the sampling probability keeps decreasing for each subsequent tuple (see Algorithm 1, Background section, above). This property allows the algorithm to release memory from the join buffer and transfer it to the reservoir. However, as mentioned above the benefit of increasing a reservoir size comes at a cost on the uniformity of the sample. PRJS needs to know the values of m (uniformity confidence recovery tuple count) and ζ (uniformity confidence threshold). Given the time left until the sample-use (or collection) time (denoted as T), the number of tuples (denoted as l) that would be generated during T if there were no join sampling is computed as follows:

$$l = T\lambda_1\lambda_2(W_1 + W_2)\sum_{v \in D} f_1(v)f_2(v) \quad \{15\}$$

As mentioned above, PRJS proceeds in two phases: 1) a join-sampling phase and 2) a reservoir-sampling phase. Tuples in the join-sampling phase are sampled with a probability $p_1$. Therefore, the expected number of tuples to be seen by the reservoir sampling phase (m) is:

$$m = lp_1 \quad \{16\}$$

Given m and ζ, PRJS works as shown in Algorithm 7. There are four main steps in the algorithm. The first step (Lines 2-13) concerns the memory transfer mechanism of PRJS. Initially there is no memory that can be transferred, since the memory utilization of the join buffer is 100%. As long as this is the case, PRJS works in the same way as RJS does (see Algorithm 6) except that, for each new tuple $s_i$ arriving on join input stream $S_i$, $p_1$ is decreased to $r/(k+1)$ and, accordingly, PRJS re-computes memory utilization of the join buffer. The reason for assigning this particular value to $p_1$ is that all $S_i$-probe join tuples to be produced by $s_i$ while $s_i \in W_i$ should be sampled with effectively a probability of no more than $r/(k+1)$. In other words, this is the smallest possible value that can be assigned to $p_1$. PRJS keeps decreasing $p_1$ and re-computing the memory utilization until it finds that some memory can be released from the join buffer and transferred to the reservoir. In the second step (Lines 14-18) and in the third step (Lines 19-24), PRJS finds the largest amount of memory (δ) that can be released from the join buffer and transferred to the reservoir, considering the following constraints:

Refill confidence: The refill confidence, RC, is defined as the probability that m is at least the same as the enlarged reservoir size. That is given r and δ:

$$RC(m) = \text{probability}(m >= r+\delta) \quad \{17\}$$

Unlike progressive reservoir sampling (see Algorithm 4), PRJS cannot guarantee that the enlarged reservoir will be filled out of m tuples since m is only an expected number of tuples on the outcome of the join-sampling phase (see Equation {16}). That is, the value of m is an expected value rather than an exact value. This means that actual value of m may be less than r+δ, and this implies that $\delta \leq y \leq \min(m, r+\delta)$. (y is the number of tuples to be selected from the m tuples). Therefore, the algorithm has to make sure that y falls in that range with a confidence no less than a given threshold ξ.

Uniformity confidence: UC≧ζ. (See Equation {3}) That is, the uniformity confidence should be no less than ζ after the enlarged reservoir is filled.

Uniformity-recovery tuple count: $m \geq (x+y)-(p_1(k+1))$. The rationale for this constraint is as follows. PRJS assumes the reservoir sample (of x+y tuples) will be used (or collected) after it will have seen m tuples. But if the sample-use does not happen, then it will have to continue with the conventional reservoir sampling on the join-sample tuples as if the sample in the reservoir were a uniform random sample of all join result tuples seen so far. In this case, $(x+y)/((k+(m/p_1))+1) \leq p_1$. Hence, $m \geq (x+y)-(p_1(k+1))$.

If all these three constraints are satisfied, then in the second step PRJS keeps decreasing $p_1$ and increasing δ until one or more of them are not satisfied anymore. The more $p_1$ is decreased, the larger δ can be. Therefore, PRJS finds the smallest possible $p_1$ that makes the three constraints satisfied. This ensures to find the largest possible memory (δ) to be transferred to the reservoir.

When PRJS enters the third step, δ has been set too large to satisfy one or more of the three constraint. So, PRJS decreases δ until the constraints are satisfied or δ becomes 0. The latter case means that the reservoir size cannot be increased. Once δ (>0) is determined, in the fourth step (Line 25-29) PRJS releases δ memory units from the join buffer and allocates the released memory to the reservoir. Then, PRJS works in the same way as in the progressive reservoir sampling (see Lines 6-8 of Algorithm 4) to refill the reservoir.

Join Sampling—Experimental Examples

As mentioned several times above, there is a tradeoff between the presented RJS and PRJS algorithms, i.e., Algorithms 6 and 7, respectively. Thus, in one experiment the aim was to compare these two algorithms in terms of the two traded factors: 1) the achieved reservoir sample size and 2) the achieved (recovered) uniformity of the sample. In addition, another set of experiments was performed to put the evaluations in the database context. Specifically, an aggregation (AVG) was performed on the reservoir sample, and comparison made on the aggregation errors between the two algorithms.

The experimental results confirm the following:

Size of reservoir sample: Regardless of the initial reservoir size, PRJS eventually results in a reservoir larger than the fixed-size reservoir of RJS.

Uniformity of reservoir sample: The RJS's sample uniformity is always no lower than PRJS's sample uniformity. For PRJS, the uniformity is degraded when the reservoir size is increased but starts recovering promptly and approaches toward 100% as additional join-sample tuples are generated.

Aggregation on a reservoir sample: For all the experimental settings used, it has been observed from the results of aggregation errors on the reservoir sample that the benefit of gaining reservoir size is larger than the cost of losing sample uniformity. PRJS achieves smaller aggregation errors than RJS unless the initial reservoir size is too large for PRJS to have room for increasing the size.

Algorithm setup: Both window sizes ($W_1$ and $W_2$) were set to 500 time units, and the two stream rates ($\lambda_1$ and $\lambda_2$) were set to 1 tuple per time unit and 5 tuples per time unit, respectively. Memory allocated to join buffer was 50% of the memory required for an exact result. The initial size of reservoir was 100 (i.e., r=100 tuples) which represented 6% of the total available memory. Both the uniformity confidence threshold $\zeta$ and the refill confidence threshold $\xi$ were set to 0.90. It is believed this value is sufficiently large to constrain the increase of reservoir size in PRJS. Unless stated otherwise, the results reported were obtained as an average of the results of 50 runs.

Data streams setup: Stream data sets each containing tuples amounting to 10000 time units were generated. Values of join attribute in the input stream tuples were generated assuming the frequency-based model as indicated above. The values were drawn from a normal distribution with mean $\mu=1000$ and variance $\sigma^2=1000$. Values of aggregate attribute were drawn from a normal distribution with mean $\mu=1000$ and variance $\sigma^2=10000$.

Reservoir Sample Size

Figure 12:
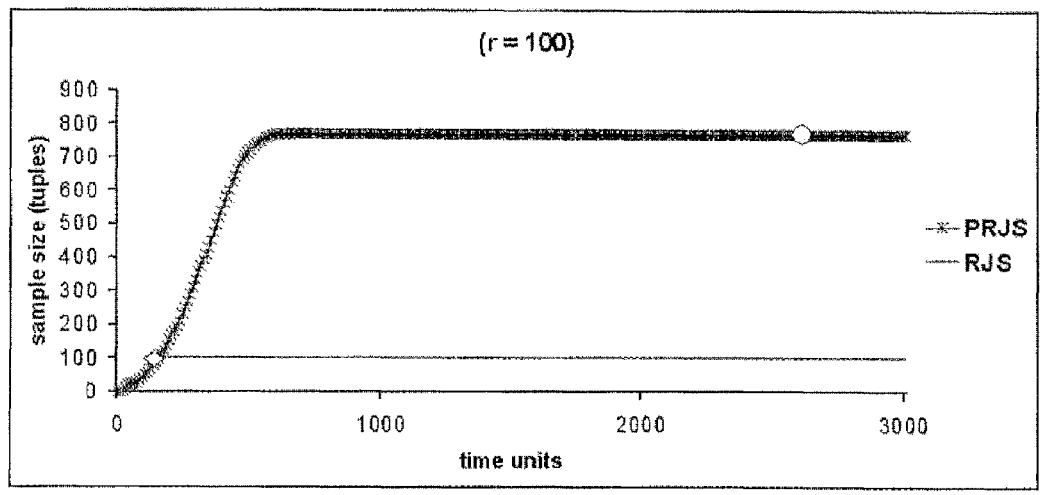
FIG. 12 is graph of sample size versus time for a sample size experiment performed on reservoir join-sampling (RJS) and progressive reservoir join-sampling (PRJS) algorithms of the present disclosure, wherein reservoir size increase time is marked with a diamond and sample-use time is marked with a circle.

An objective of this experiment was to observe how the size of a sample in the reservoir changes size over time. FIG. 12 shows the average sample size over time, at the interval of 10 time units, for both PRJS and RJS. For PRJS, the sample size increased linearly until the enlarged reservoir was filled, and then the increase saturated. The same happened for RJS, but sample size did not ever exceed the initial reservoir size.

Figure 13:
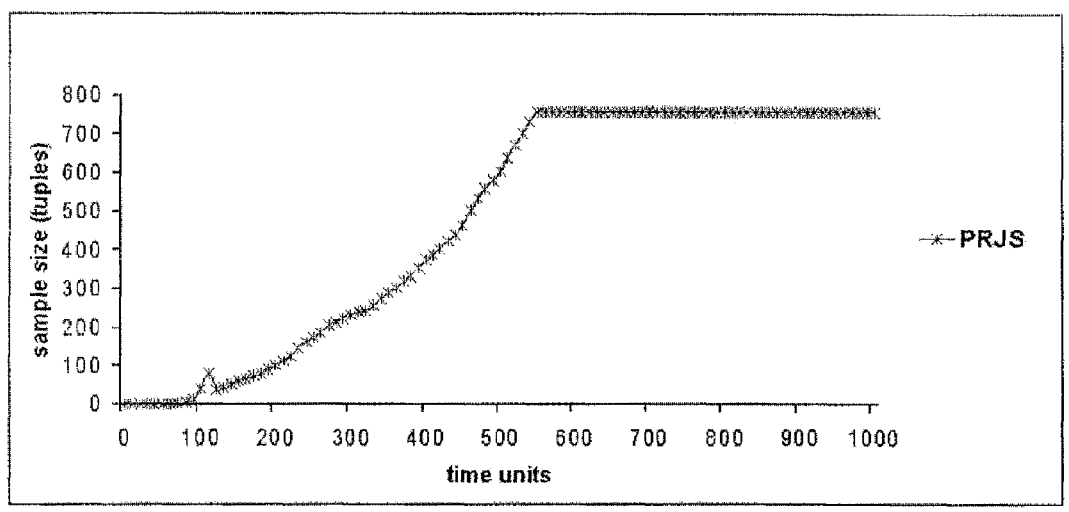
FIG. 13 is a magnified graph of sample size versus time for the sample size experiment performed on the PRJS algorithm.

FIG. 13 shows the sample size over the first 1000 time units for a single run. Note that the sample size decreased initially because some sample tuples were evicted from the reservoir after x and y were decided. This is recovered quickly after that.

Figure 14:
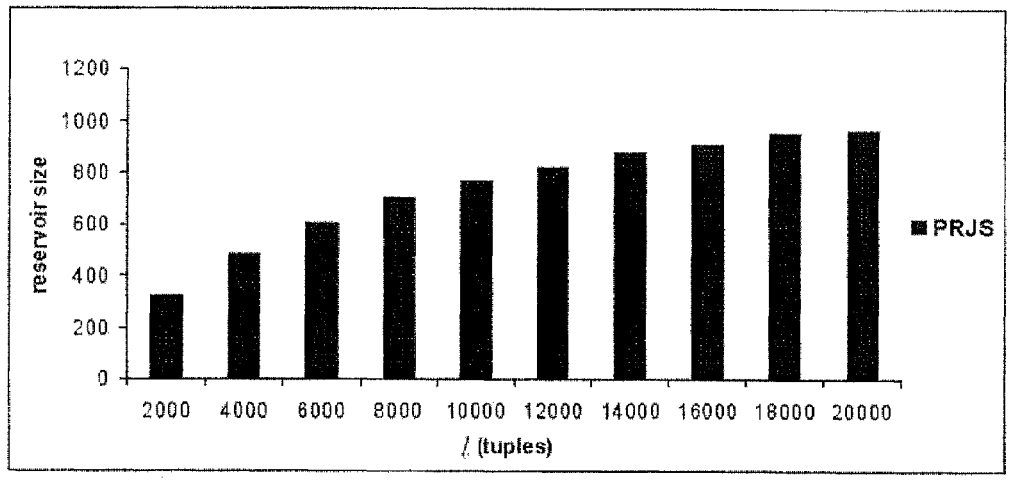
FIG. 14 is a graph of reservoir size versus the number, l, of tuples that would be generated without join-sampling by the time the reservoir sample will be used for the sample size experiment performed on the PRJS algorithm, showing the effect of l on the reservoir size.

FIG. 14 shows the effect of PRJS on the reservoir size for varying l, which was used instead of m because the value of m is an expected value for a given l (see Equation {16}). The figure shows that the increase of size was larger for larger values of l. The effect saturated for relatively large values of l.

Reservoir Sample Uniformity

The purpose of this set of experiments was to test the uniformity of the sample in the reservoir. The chi-squared ($\chi 2$) statistic was used as a metric of the sample uniformity. Higher $\chi 2$ indicates lower uniformity and vice versa. The $\chi 2$ statistic measures, for each value v in a domain D, the relative difference between the observed number of tuples (o(v)) and the expected number of tuples (e(v)) that contain the value. That is:

$$x^2 = \sum_{\forall v \in D} \frac{(e(v) - o(v))^2}{e(v)} \quad \{18\}$$

Figure 15:
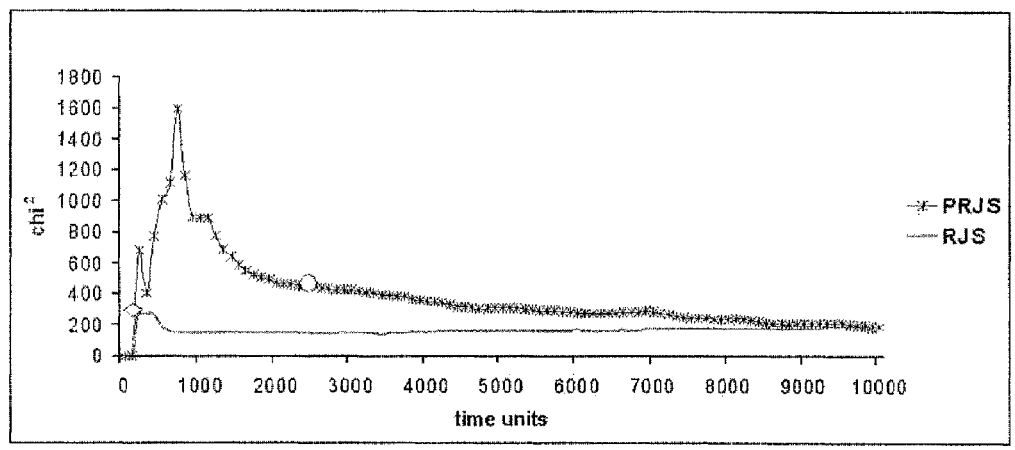
FIG. 15 is a graph of sample uniformity versus time for both of the RJS and PRJS algorithms during the sample size experiment, wherein reservoir size increase time is marked with a diamond and sample-use time is marked with a circle.

FIG. 15 shows the $\chi 2$ statistic over time for both algorithms, at the interval of 100 time units. The underlying assumption was that the input stream is randomly sorted on the join attribute value. The results in the figure show that for PRJS the uniformity was decreased after the reservoir size was increased, but it started recovering before the sample-use time. As expected, the sample uniformity for RJS was better and was almost stable over time.

Figure 16:
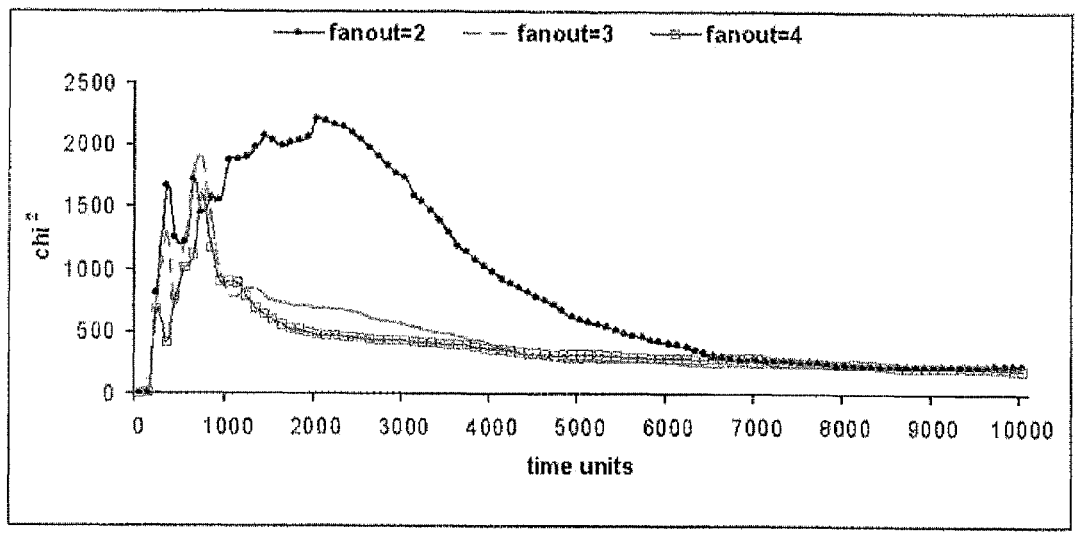
FIG. 16 is a graph of sample uniformity versus time for the PRJS algorithm during experiments using partially sorted streams.

Since PRJS evicts some tuples from the reservoir in order to refill the reservoir with the incoming tuples, the uniformity can be damaged more if there is some sort of dependence in the arrival of join attribute values on the input streams. Therefore, an experiment was conducted to test the effect of the ordering of tuples in the input streams by the join attribute. For this, partially sorted streams were generated. This was done by configuring the values in the domain of the attribute into a tree structure. In the tree, the value in a parent node had a precedence in appearing in the input stream over the values in the children nodes. Between siblings there was no precedence conditions. The number of children of each node was fixed and was parameterized as fanout. As the value of fanout decreased, the stream became more sorted. That is, when fanout=1, the stream was totally sorted. The value of fanout was set to 2, 3, and 4 as shown in FIG. 16. FIG. 16 shows that, for PRJS, there was more damage on the uniformity when the degree of the input stream ordering was higher. On the other hand, RJS is not sensitive for any kind of ordering in the input stream. This is evident for RJS and, thus, the graph is omitted.

Aggregation on the Reservoir Samples

In this set of experiments, RJS and PRJS were compared in terms of the accuracy of aggregation (AVG) query results. The average absolute error (AE) at the interval of 500 time units for each algorithm is reported. Absolute error is defined as follows:

$$AE = \sum_{i=1}^{n} \frac{|\hat{A}_i - A_i|}{n} \quad \{19\}$$

where $A_i$ (i=1, 2, . . . , n) is the exact aggregation result computed from the original join result and $\hat{A}_i$ is the aggregation result computed from a sample in the reservoir, and n is number of runs.

Figure 17:
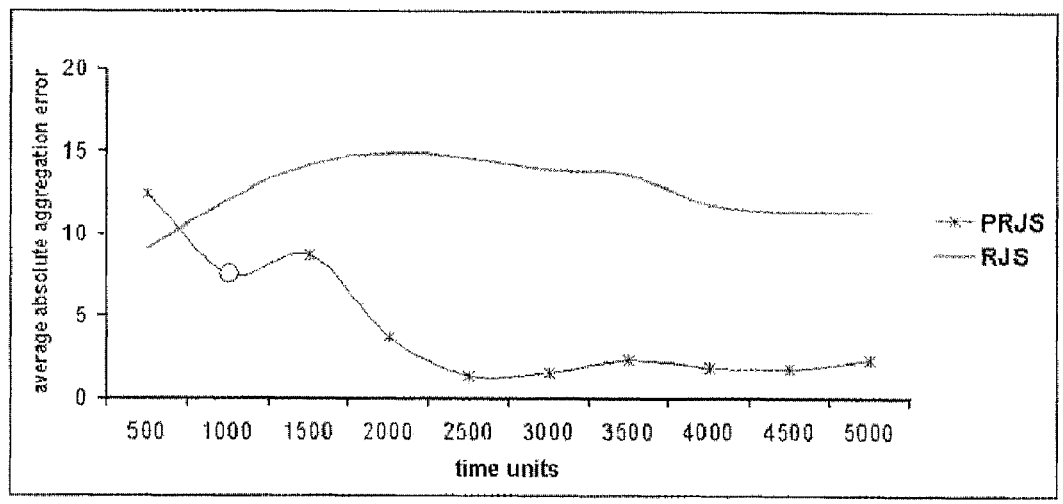
FIG. 17 is a graph of average absolute aggregation error versus time for both of the RJS and PRJS algorithms for a set of experiments directed to comparing RJS and PRJS in terms of the accuracy of aggregation.

The results shown in FIG. 17 demonstrate that right after the reservoir size increased, PRJS gave a larger aggregation error but, after that, as the sample size increased the aggregation errors decreased. The curve of PRJS crosses over the curve of RJS even before reaching the sample-use time (marked as a circle on the PRJS curve). This happens because the benefit of the enlarged reservoir size dominates over the damage in the uniformity. As the uniformity recovers more, the aggregation error decreases more.

It is noted that the algorithms, aspects, and embodiments described herein, for example, any one or more of Algorithms 2-7, above, may be conveniently implemented using one or more machines (e.g., general-purpose computing devices, devices incorporating application-specific integrated circuits, devices incorporating systems-on-chip, etc.) programmed according to the teachings of the present specification, as will be apparent to those of ordinary skill in the computer arts.

Appropriate software coding can readily be prepared by skilled programmers based on the teachings of the present disclosure, as will be apparent to those of ordinary skill in the software art.

Such software may be a computer program product that employs one or more machine-readable media and/or one or more machine-readable signals. A machine-readable medium may be any medium that is capable of storing and/or encoding a sequence of instructions for execution by a machine (e.g., a general purpose computing device) and that causes the machine to perform any one of the methodologies and/or embodiments described herein. Examples of a machine-readable medium in the form of a non-volatile machine-readable medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combination thereof. A machine-readable medium, as used herein, is intended to include a single medium as well as a collection of physically separate media, such as, for example, a collection of compact disks or one or more hard disk drives in combination with a computer memory. As those skilled in the art will readily appreciate, the term "non-volatile" as used above and in the amended claims excludes encoded signals that propagate via electromagnetic energy, pressure energy, or other form of energy.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, a computerized device, such as a wireless sensor or dedicated proxy device, any machine capable of executing a sequence of instructions that specify an action to be taken by that machine, and any combination thereof.

Figure 18:
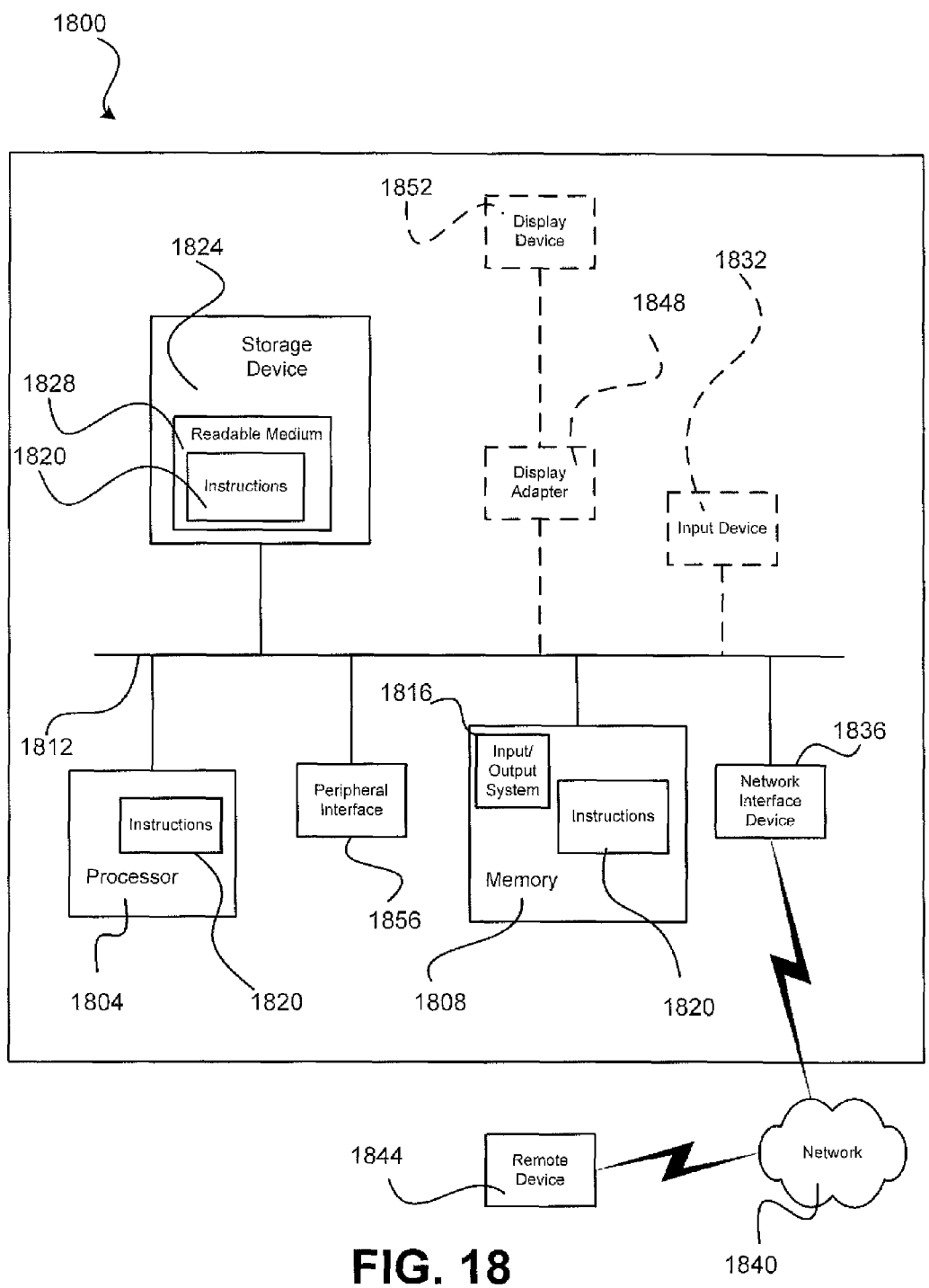
FIG. 18 is a high-level schematic diagram illustrating a computing device representative of computing devices that could be used for implementing any one or more of the algorithms of the present disclosure.

FIG. 18 shows a diagrammatic representation of one embodiment of a computing device in the exemplary form of a computer system 1800 within which a set of instructions for causing the device to perform any one or more of the aspects and/or methodologies of the present disclosure may be executed. Computer system 1800 includes a processor 1804 (e.g., a microprocessor) (more than one may be provided) and a memory 1808 that communicate with each other, and with other components, via a bus 1812. Bus 1812 may include any of several types of bus structures including, but not limited to, a memory bus, a memory controller, a peripheral bus, a local bus, and any combination thereof, using any of a variety of bus architectures well known in the art.

Memory 1808 may include various components including, but not limited to, a random access read/write memory component (e.g, a static RAM (SRAM), a dynamic RAM (DRAM), etc.), a read only component, and any combination thereof. In one example, a basic input/output system 1816 (BIOS), including basic routines that help to transfer information between elements within computer system 1800, such as during start-up, may be stored in memory 1808. Memory 1808 may also include (e.g., stored on one or more machine-readable media) instructions (e.g., software) 1820 embodying any one or more of the aspects and/or methodologies of the present disclosure. In another example, memory 1808 may further include any number of instruction sets including, but not limited to, an operating system, one or more application programs, other program modules, program data, and any combination thereof.

Computer system 1800 may also include one or more storage devices 1824. Examples of storage devices suitable for use as any one of the storage devices 1824 include, but are not limited to, a hard disk drive device that reads from and/or writes to a hard disk, a magnetic disk drive device that reads from and/or writes to a removable magnetic disk, an optical disk drive device that reads from and/or writes to an optical media (e.g., a CD, a DVD, etc.), a solid-state memory device, and any combination thereof. Each storage device 1824 may be connected to bus 1812 by an appropriate interface (not shown). Example interfaces include, but are not limited to, Small Computer Systems Interface (SCSI), advanced technology attachment (ATA), serial ATA, universal serial bus (USB), IEEE 13144 (FIREWIRE), and any combination thereof. In one example, storage device 1824 may be removably interfaced with computer system 1800 (e.g., via an external port connector (not shown)). Particularly, storage device 1824 and an associated machine-readable medium 1828 may provide nonvolatile and/or volatile storage of machine-readable instructions, data structures, program modules, and/or other data and/or data storage for computer system 1800. In one example, software 1820 may reside, completely or partially, within machine-readable medium 1828. In another example, software 1820 may reside, completely or partially, within processor 1804.

In some embodiments, such as a general purpose computer, computer system 1800 may also include one or more input devices 1832. In one example, a user of computer system 1800 may enter commands and/or other information into the computer system via one or more of the input devices 1832. Examples of input devices that can be used as any one of input devices 1832 include, but are not limited to, an alpha-numeric input device (e.g., a keyboard), a pointing device, a joystick, an audio input device (e.g., a microphone, a voice response system, etc.), a cursor control device (e.g., a mouse), a touchpad, an optical scanner, a video capture device (e.g., a still camera, a video camera), touchscreen, a digitizer pad, and any combination thereof. Each input device 1832 may be interfaced to bus 1812 via any of a variety of interfaces (not shown) including, but not limited to, a serial interface, a parallel interface, a game port, a Universal Serial Bus (USB) interface, a FIREWIRE interface, a direct interface to the bus, a wireless interface (e.g., a Bluetooth® connection) and any combination thereof.

Commands and/or other information may be input to computer system 1800 via storage device 1824 (e.g., a removable disk drive, a flash drive, etc.) and/or one or more network interface devices 1836. A network interface device, such as network interface device 1836, may be utilized for connecting computer system 1800 to one or more of a variety of networks, such as network 1840, and one or more remote devices 1844 connected thereto. Examples of a network interface device include, but are not limited to, a network interface card, a modem, a wireless transceiver (e.g., a Bluetooth® transceiver) and any combination thereof. Examples of a network include, but are not limited to, a wide area network (e.g., the Internet, an enterprise network), a local area network (e.g., a network associated with an office, a building, a campus, a group of wireless sensors or other group of data streaming devices, or other relatively small geographic space), a telephone network, a direct connection between two computing devices, and any combination thereof. A network, such as network 1840, may employ a wired and/or a wireless mode of communication. In general, any network topology may be used. Information (e.g., data, software 1820, etc.) may be communicated to and/or from computer system 1800 via the one or more network interface devices 1836.

In some embodiments, such as a general purpose computer, computer system 1800 may further include a video display adapter 1848 for communicating a displayable image to a display device, such as display device 1852. Examples of a display device include, but are not limited to, a liquid crystal display (LCD), a cathode ray tube (CRT), a plasma display, and any combination thereof. In addition to a display device, a computer system 1800 may include one or more other peripheral output devices including, but not limited to, an audio speaker, a printer, and any combination thereof. Such peripheral output devices may be connected to bus 1812 via a peripheral interface 1856. Examples of a peripheral interface include, but are not limited to, a serial port, a USB connection, a FIREWIRE connection, a parallel connection, and any combination thereof.

A digitizer (not shown) and an accompanying pen/stylus, if needed, may be included in order to digitally capture freehand input. A pen digitizer may be separately configured or coextensive with a display area of display device 1852. Accordingly, a digitizer may be integrated with display device 1852, or may exist as a separate device overlaying or otherwise appended to the display device.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of maintaining a uniform random sample by a machine, comprising:
    establishing in a machine memory a sampling reservoir having a size;
    receiving in the machine memory a uniformity confidence threshold value;
    receiving a data stream containing sequentially arriving tuples;
    sampling the data stream so as to store ones of the sequentially arriving tuples in the sampling reservoir so as to create stored tuples, wherein ones of the sequentially arriving tuples not stored in the sampling reservoir are discarded and not stored anywhere;
    while sampling, adjusting the size of the sampling reservoir in a controlled manner; and
    after adjusting the size, continuing sampling the data stream and storing ones of the sequentially arriving tuples in the sampling reservoir so as to maintain a sample of the data stream with a certain uniformity confidence as a function of the uniformity confidence threshold value;
    wherein said adjusting of the size of the sampling reservoir in a controlled manner includes increasing the size of the sampling reservoir;
    the method further comprising:
        providing an increased size; and
        determining a smallest uniformity confidence recovery tuple count as a function of the increased size and the uniformity confidence threshold value.

2. The method according to claim 1, further comprising, prior to said adjusting of the size of the sampling reservoir, detecting whether to increase the size or decrease the size.

3. The method according to claim 1, wherein said adjusting of the size of the sampling reservoir in a controlled manner includes calculating the certain uniformity confidence and comparing the calculated uniformity confidence to the uniformity confidence threshold value.

4. The method according to claim 3, wherein said sampling of the data stream is performed using a sampling algorithm that provides a sample of a particular size, and the certain uniformity confidence at a given time is a probability that the sampling generates a uniform random sample at the given time.

5. The method according to claim 1, wherein said continuing of the sampling proceeds as a function of the size of the sampling reservoir, the certain uniformity confidence and the smallest uniformity confidence recovery tuple count.

6. The method according to claim 1, further comprising, following said increasing of the size of the sampling reservoir, evicting a number of stored tuples from the sampling reservoir.

7. The method according to claim 6, further comprising flipping a biased coin to determine the number of stored tuples evicted from the sampling reservoir.

8. The method according to claim 6, further comprising generating the number randomly from a probability distribution.

9. The method according to claim 1, wherein the machine memory has a limited size and the method further comprises:
    establishing in the machine memory a plurality of sampling reservoirs each having a size;
    receiving a plurality of data streams each containing a plurality of sequentially arriving tuples, the plurality of data streams corresponding respectively to the plurality of sampling reservoirs;
    checking whether the size of any one or more of the plurality of sampling reservoirs should be changed; and
    for each of the plurality of sampling reservoirs for which the size should be changed, adjusting the size of that one of the plurality of sampling reservoirs as a function of the limited size of the machine memory.

10. The method according to claim 9, wherein said checking of whether the size of any one or more of the plurality of sampling reservoirs should be changed includes:
    computing a relative change in the size of each of the plurality of sampling reservoirs; and
    comparing the relative change in the size of each of the plurality of sampling reservoirs to a memory adjustment threshold value.

11. The method according to claim 10, wherein said adjusting of the limited size of the machine memory is performed when the relative change in size of at least one of the plurality of sampling reservoirs exceeds the memory adjustment threshold value.

12. The method according to claim 10, further comprising, if the relative change in size of at least one of the plurality of sampling reservoirs exceeds the memory adjustment threshold value, determining, for each of the plurality of sampling reservoirs in which the size should be increased, when the certain uniformity confidence exceeds the uniformity confidence threshold value.

13. The method according to claim 12, further comprising computing, for each of the plurality of sampling reservoirs in which the size should be increased, a number of tuples to be seen from the corresponding respective one of the plurality of data streams to fill that one of the plurality of sampling reservoirs.

14. The method according to claim 13, further comprising, for each of the plurality of sampling reservoirs in which the certain uniformity confidence exceeds the uniformity confidence threshold value, evicting a number of stored tuples from that one of the plurality of sampling reservoirs and replacing evicted ones of the stored tuples with tuples from the corresponding respective one of the plurality of data streams.

15. The method according to claim 14, further comprising flipping a biased coin to determine the number of stored tuples evicted from the sampling reservoir.

16. The method according to claim 14, further comprising generating the number randomly from a probability distribution to determine the number of stored tuples evicted from the sampling reservoir.

17. A non-transitory computer-readable medium containing computer-executable instructions for performing a method of maintaining a uniform random sample, the computer-executable instructions comprising:
   a first set of computer-executable instructions for receiving a data stream containing sequentially arriving tuples;
   a second set of computer-executable instructions for sampling the data stream so as to store ones of the sequentially arriving tuples in a sampling reservoir so as to create stored tuples, wherein ones of the sequentially stored tuples not stored in the sampling reservoir are discarded and not stored anywhere;
   a third set of computer-executable instructions for adjusting the size of the sampling reservoir in a controlled manner while sampling; and
   a fourth set of computer-executable instructions for continuing sampling the data stream after the adjusting of the size and storing ones of the sequentially arriving tuples in the sampling reservoir so as to maintain a sample of the data stream with a certain uniformity confidence as a function of a stored uniformity confidence threshold value;
   wherein said third set of computer-executable instructions includes computer-executable instructions for increasing the size of the sampling reservoir; and
   the non-transitory computer-readable medium further containing computer-executable instructions for determining a smallest uniformity confidence recovery tuple count as a function of an increased size of the sampling reservoir and the uniformity confidence threshold value.

18. The non-transitory computer-readable medium according to claim 17, further comprising computer-executable instructions for detecting whether to increase the size or decrease the size prior to the adjusting of the size of the sampling reservoir.

19. The non-transitory computer-readable medium according to claim 17, wherein said third set of computer-executable instructions includes computer-executable instructions for calculating the certain uniformity confidence and comparing the calculated uniformity confidence to the stored uniformity confidence threshold value.

20. The non-transitory computer-readable medium according to claim 19, wherein said second set of computer-executable instructions encodes a sampling algorithm that provides a sample of a particular size, and the certain uniformity confidence at a given time is a probability that the sampling generates a uniform random sample at the given time.

21. The non-transitory computer-readable medium according to claim 17, wherein said fourth set of computer-executable instructions provides that the sampling proceeds as a function of the size of the sampling reservoir, the uniformity confidence and the smallest uniformity confidence recovery tuple count.

22. The non-transitory computer-readable medium according to claim 17, further comprising computer-executable instructions for evicting a number of stored tuples from the sampling reservoir following the increasing of the size of the sampling reservoir.

23. The non-transitory computer-readable medium according to claim 22 further comprising computer-executable instructions for flipping a biased coin to determine the number.

24. The non-transitory computer-readable medium according to claim 22 further comprising computer-executable instructions for generating the number randomly from a probability distribution.

25. The non-transitory computer-readable medium according to claim 17, wherein the machine memory has a limited size and the computer-executable instructions further comprise:
   computer-executable instructions for establishing in the machine memory a plurality of sampling reservoirs each having a size;
   computer-executable instructions for receiving a plurality of data streams each containing a plurality of sequentially arriving tuples, the plurality of data streams corresponding respectively to the plurality of sampling reservoirs;
   computer-executable instructions for checking whether the size of any one or more of the plurality of sampling reservoirs should be changed; and
   computer-executable instructions that, for each of the plurality of sampling reservoirs for which the size should be changed, adjusts the size of that one of the plurality of sampling reservoirs as a function of the limited size of the machine memory.

26. The non-transitory computer-readable medium according to claim 25, wherein said computer-executable instructions for checking of whether the size of any one or more of the plurality of sampling reservoirs should be changed include:
   computer-executable instructions for computing a relative change in the size of each of the plurality of sampling reservoirs; and
   computer-executable instructions for comparing the relative change in the size of each of the plurality of sampling reservoirs to a memory adjustment threshold value.

27. The non-transitory computer-readable medium according to claim 26, further comprising computer-executable instructions for adjusting of the limited size of the machine memory when the relative change in size of at least one of the plurality of sampling reservoirs exceeds the memory adjustment threshold value.

28. The non-transitory computer-readable medium according to claim 26, further comprising computer-executable instructions for determining, for each of the plurality of sampling reservoirs in which the size should be increased, when certain uniformity confidence exceeds the stored uniformity confidence threshold value only if the relative change in size of at least one of the plurality of sampling reservoirs exceeds the memory adjustment threshold value.

29. The non-transitory computer-readable medium according to claim 28, further comprising computer-executable instructions for computing, for each of the plurality of sampling reservoirs in which the size should be increased, a number of tuples to be seen from the corresponding respective one of the plurality of data streams to fill that one of the plurality of sampling reservoirs.

30. The non-transitory computer-readable medium according to claim 29, further comprising computer-executable instructions for evicting, for each of the plurality of sampling reservoirs in which the certain uniformity confidence exceeds the stored uniformity confidence threshold value, a number of stored tuples from that one of the plurality of sampling reservoirs and replacing evicted ones of the stored tuples with tuples from the corresponding respective one of the plurality of data streams.

31. The non-transitory computer-readable medium according to claim 30, further comprising computer-executable instructions for flipping a biased coin to determine the number of stored tuples evicted from the sampling reservoir.

32. The non-transitory computer-readable medium according to claim 30, further comprising computer-executable instructions for generating the number randomly from a probability distribution to determine the number of stored tuples evicted from the sampling reservoir.

* * * * *